United States Patent
Yoshida et al.

(10) Patent No.: US 6,212,518 B1
(45) Date of Patent: Apr. 3, 2001

(54) SYSTEM AND METHOD FOR RETRIEVAL OF DATA FROM RELATED DATABASES BASED UPON DATABASE ASSOCIATION MODEL

(75) Inventors: Taketoshi Yoshida; Toshiaki Yoshino; Hiroyuki Sato, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/144,646

(22) Filed: Aug. 31, 1998

(30) Foreign Application Priority Data

Feb. 2, 1998 (JP) ................................. 10-020528
Apr. 15, 1998 (JP) ................................. 10-104397

(51) Int. Cl.⁷ ............................................... G06F 17/30
(52) U.S. Cl. ......................... 707/5; 707/4; 709/218
(58) Field of Search ..................... 707/5, 10, 4; 709/218

(56) References Cited

U.S. PATENT DOCUMENTS

| | | | |
|---|---|---|---|
| 5,596,744 | * 1/1997 | Dao et al. | 707/10 |
| 5,640,553 | * 6/1997 | Schultz | 707/5 |
| 5,694,523 | * 12/1997 | Wical | 706/45 |
| 5,694,594 | * 12/1997 | Chang | 707/6 |
| 5,724,567 | * 3/1998 | Rose et al. | 707/2 |
| 5,787,421 | * 7/1998 | Nomiyama | 707/5 |
| 5,845,278 | * 12/1998 | Kirsch et al. | 707/3 |
| 5,913,214 | * 6/1999 | Madnick et al. | 707/10 |
| 5,920,856 | * 6/1999 | Syeda-Mahmood | 707/3 |
| 5,931,907 | * 8/1999 | Davies et al. | 709/218 |
| 5,940,821 | * 8/1999 | Wical | 707/3 |
| 5,960,422 | * 10/1999 | Prasad | 707/2 |
| 5,983,216 | * 11/1999 | Kirsch et al. | 707/2 |
| 5,995,959 | * 11/1999 | Friedman et al. | 707/3 |
| 6,026,429 | * 2/2000 | Jones et al. | 709/201 |
| 6,035,298 | * 3/2000 | McKearney | 707/10 |
| 6,038,560 | * 3/2000 | Wical | 707/5 |
| 6,049,799 | * 4/2000 | Mangat et al. | 707/10 |
| 6,070,160 | * 5/2000 | Geary | 707/4 |

* cited by examiner

Primary Examiner—John E. Breene
Assistant Examiner—Luke S Wassum
(74) Attorney, Agent, or Firm—Staas & Halsey LLP

(57) ABSTRACT

A relevant-information retrieval system manages a model which describes a relevancy among a plurality of databases in accordance with associative values or a tree structure. Besides, when the retrieval system has received a search request for a certain database from a searcher, it specifies one of the databases administering information relevant to the certain database, in accordance with the model, and it presents information of the specified database to the searcher.

20 Claims, 27 Drawing Sheets

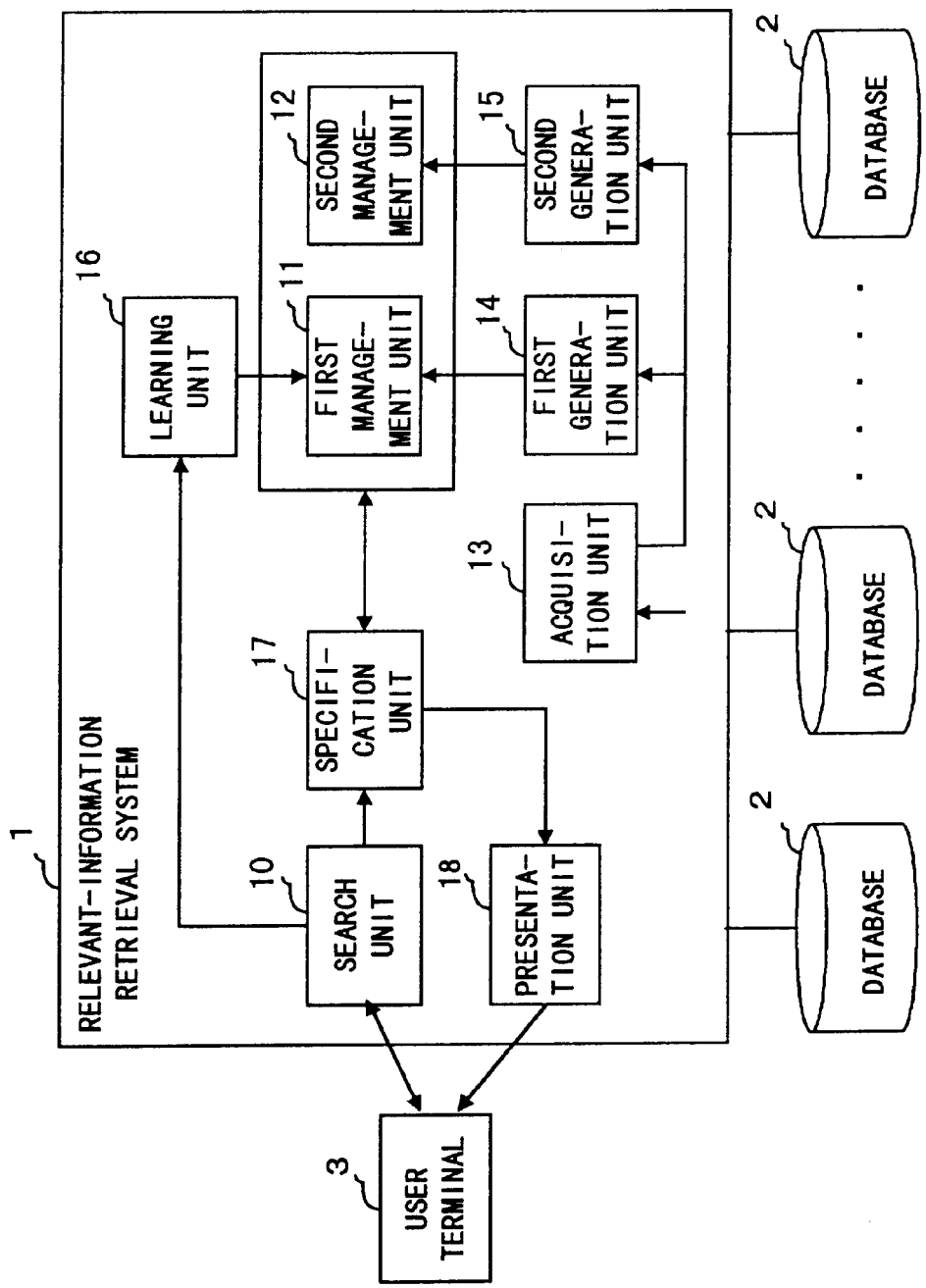
F I G. 1

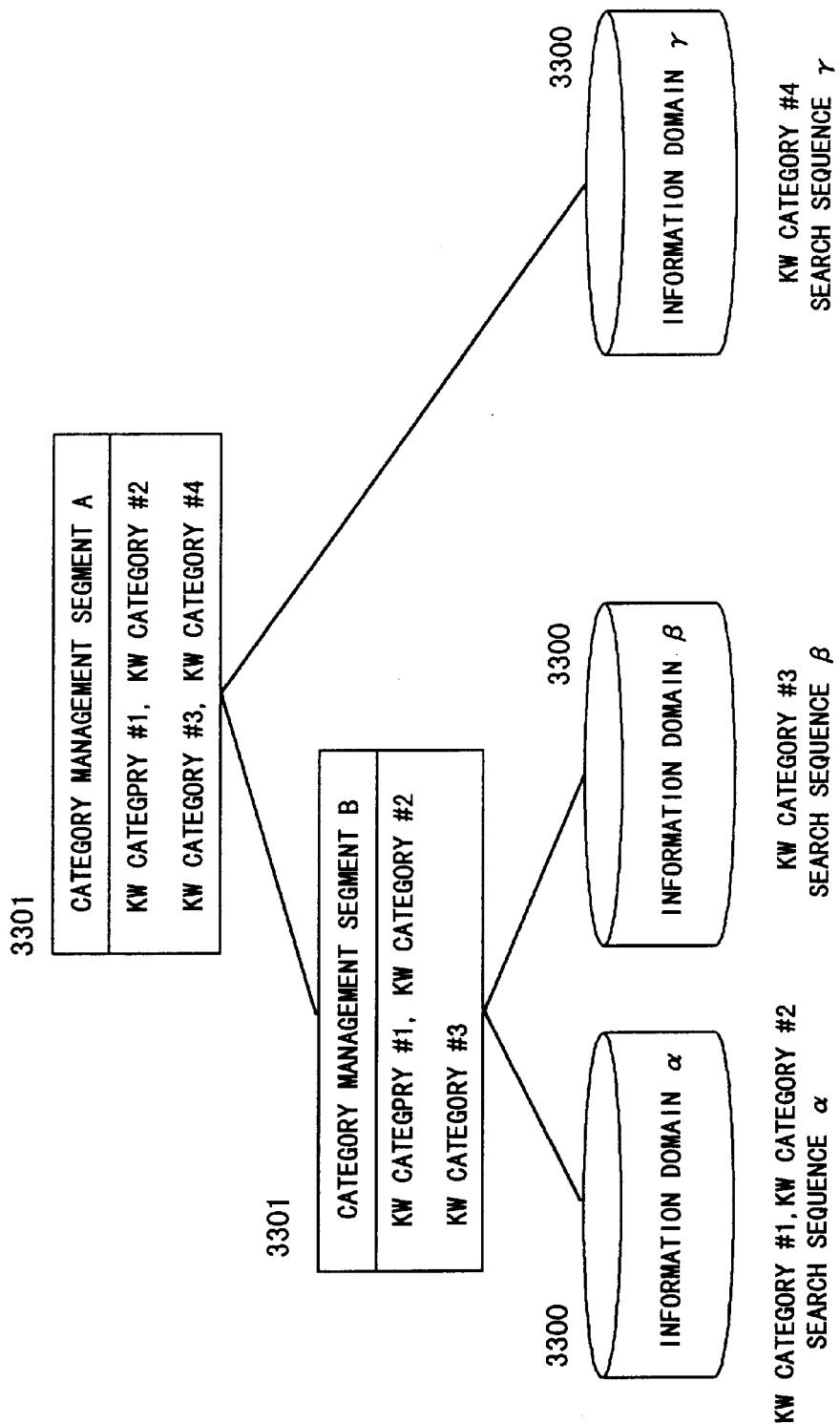
F I G. 5

|  | | ASSOCIATION SOURCE | |
|---|---|---|---|
|  | | MANDATORY | OPTIONAL |
| ASSOCIATION DESTINATION | MANDATORY | α | γ |
|  | OPTIONAL | β | δ |

FIG. 8

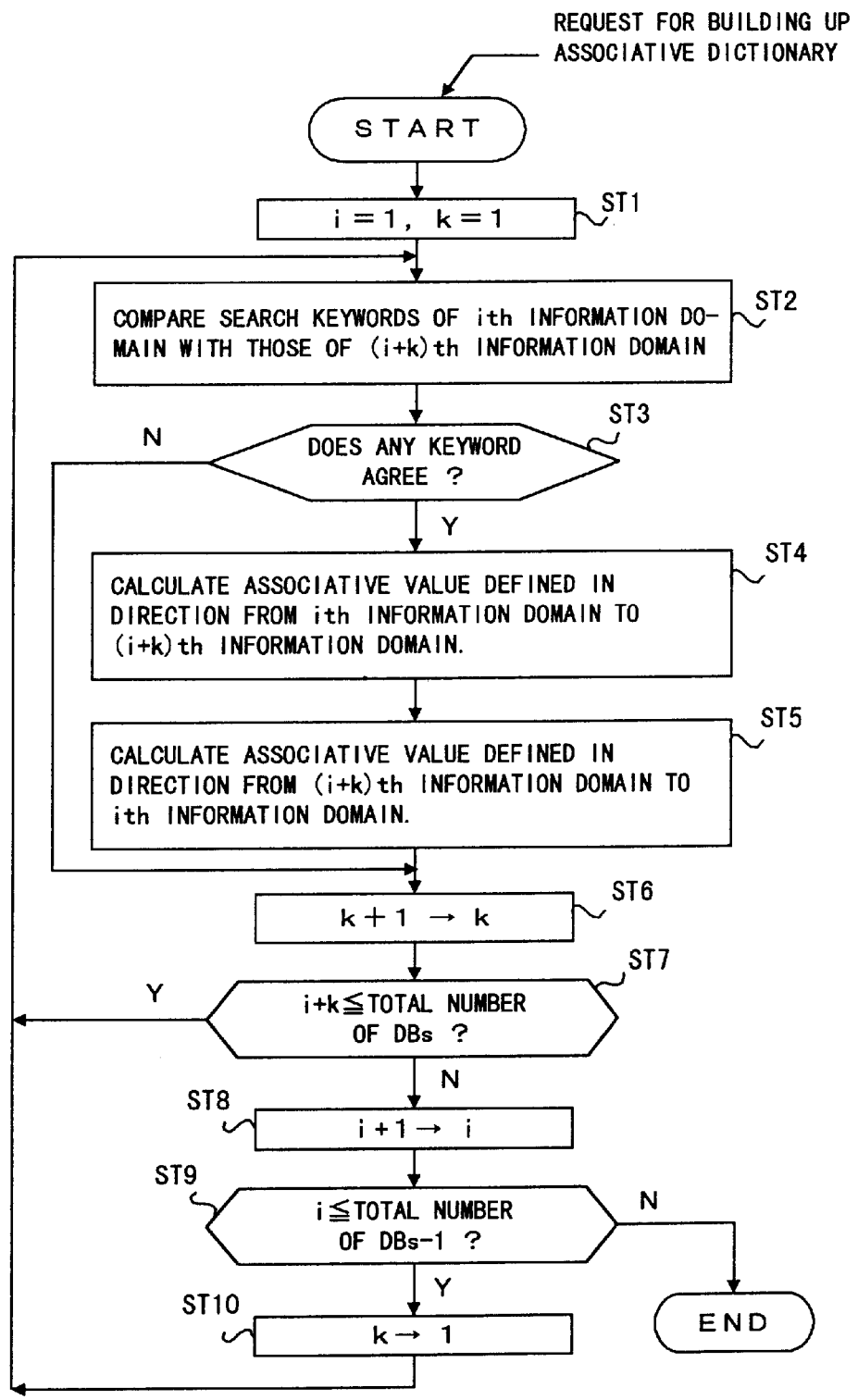
F I G. 1 1

|  | ASSOCIATION SOURCE ||
| | | MANDATORY | OPTIONAL |
|---|---|---|---|
| ASSOCIATION DESTINATION | MANDATORY | 4 | 3 |
| | OPTIONAL | 2 | 1 |

F I G. 1 4

| ASSOCIATIVE ROUTE | ESTIMATIVE VALUE OF FIRST LEVEL | ESTIMATIVE VALUE OF SECOND LEVEL | TOTAL OF ESTIMATIVE VALUES |
|---|---|---|---|
| ASSOCIATIVE ROUTE #1<br>INFORMATION DOMAIN: #3→#1→#2 | $\frac{6}{4}$ | $\frac{2}{9}$ | 1.722 |
| ASSOCIATIVE ROUTE #2<br>INFORMATION DOMAIN: #3→#1→#4 | $\frac{6}{4}$ | $\frac{6}{9}$ | 2.167 |
| ASSOCIATIVE ROUTE #3<br>INFORMATION DOMAIN: #3→#2→#1 | $\frac{2}{4}$ | $\frac{6}{9}$ | 1.167 |
| ASSOCIATIVE ROUTE #4<br>INFORMATION DOMAIN: #3→#2→#4 | $\frac{2}{4}$ | $\frac{6}{9}$ | 1.167 |
| ASSOCIATIVE ROUTE #5<br>INFORMATION DOMAIN: #3→#4→#1 | $\frac{6}{4}$ | $\frac{6}{9}$ | 2.167 |
| ASSOCIATIVE ROUTE #6<br>INFORMATION DOMAIN: #3→#4→#2 | $\frac{6}{4}$ | $\frac{2}{9}$ | 1.722 |

F I G. 17

SYSTEM AND METHOD FOR RETRIEVAL OF DATA FROM RELATED DATABASES BASED UPON DATABASE ASSOCIATION MODEL

BACKGROUND OF THE INVENTION

1. Field of the Invention

The present invention relates to a relevant-information retrieval system. More specifically, the system is used in an environment where heterogeneous databases are united, and it presents or teaches information on databases which administer information items relevant to information being currently searched for, to a searcher for the information, thereby to meet the subconscious search requests of the information searcher. The invention relates also to a program recording medium in which a program for incarnating the relevant-information retrieval system is stored. Besides, it relates to a method for retrieving such relevant information items.

2. Description of the Related Art

In recent years, very large numbers of heterogeneous databases have come to be connected through a computer network such as the Internet. Further, information items have come to be very often provided by individuals. When information is searched for with a conventional retrieval technique under such an environment, inevitably the efficiency of retrieval lowers drastically. It has therefore been required to build up a new retrieval technique for use under such an environment.

A conventional retrieval system has been premised on searching its own databases.

Under such a premise, the retrieval system has been so constructed that information sources (records) are analyzed so as to be correlated, and the information sources relevant to the information source of a request for search are searched on the basis of the correlation, thereby to realize the search for relevant information.

However, in such a case where the databases connected to a network are to be searched, the technique of the conventional retrieval system as stated above expends an enormous processing time period on the correlations of the information sources due to an explosive increase in the number of the databases, resulting in the problem that the search for the relevant information is substantially impossible.

Besides, the relevant information is often closed in a database category to which the information belongs, and the search for the relevant information cannot be always realized. Therefore, the retrieval system has the problem that the relevant information cannot be heuristically presented to the information searcher.

Moreover, in the case where the databases connected to a network are to be searched, the number of the relevant information items increases suddenly, and it becomes necessary to limit and present the relevant information items corresponding to the request of the information searcher. Nevertheless, it has not been considered at all in the conventional retrieval system that the relevant information items are limited as is necessary.

On this occasion, it is also thought out to adopt a method wherein the relevant information items are presented individually. This method, however, poses the problem that the relations of the information items are difficult to be understood or grasped.

Further, in the case where the databases connected to the network are to be searched, secondary information items on the keywords of these databases are not defined. By way of example, when the information searcher accesses the database retaining the relevant information, he/she fails to input a mandatory keyword. This causes the problem that the database is forced to execute an exceptional process, or that an access cost increases.

SUMMARY OF THE INVENTION

An object of the present invention is to provide a relevant-information retrieval system which is used in an environment where heterogeneous databases are united, and which presents a searcher for information with information on databases that administer information items relevant to the information being currently searched for, thereby to satisfy subconscious search requests of the information searcher, and a method therefor.

Another object of the present invention is to provide a program recording medium in which a program for executing such a process is held stored.

The relevant-information retrieval system according to the present invention comprises a management unit, a specification unit and a presentation unit.

In the first aspect of the present invention, the management unit manages an association model which describes the relevancies among a plurality of databases in accordance with associative values which are defined among the databases. Besides, the specification unit operate upon receiving a request for the search of a certain database, to specify databases administering information items relevant to the certain database, in accordance with the association model. In addition, the presentation unit presents the information items of the specified databases.

Further, in the econd aspect of the present invention, the management unit manages a database model which describes the relevancies among a plurality of databases in accordance with a tree structure. Besides, the specification unit operates upon receiving a request for the search of a certain database, to specify databases administering information items relevant to the certain database, in accordance with the database model. In addition, the presentation unit presents the information items of the specified databases.

Meanwhile, the program recording medium according to the present invention keeps a program for a computer stored therein, and the program causes the computer to execute the above processes of the specification unit and the presentation unit.

BRIEF DESCRIPTION OF THE DRAWINGS

FIG. 1 is a block diagram showing the fundamental construction of the present invention;

FIG. 5 is a structural diagram showing the first embodiment of a database model;

FIG. 8 is a diagram for explaining the weights of search keyboards;

FIG. 11 is a flow chart showing a first process which is executed by a VKB engine;

FIG. 14 is a diagram exemplifying the weights of the search keywords;

FIG. 17 is a diagram for explaining an estimation process for the associative routes;

DESCRIPTION OF THE PREFERRED EMBODIMENTS

Figure 2:
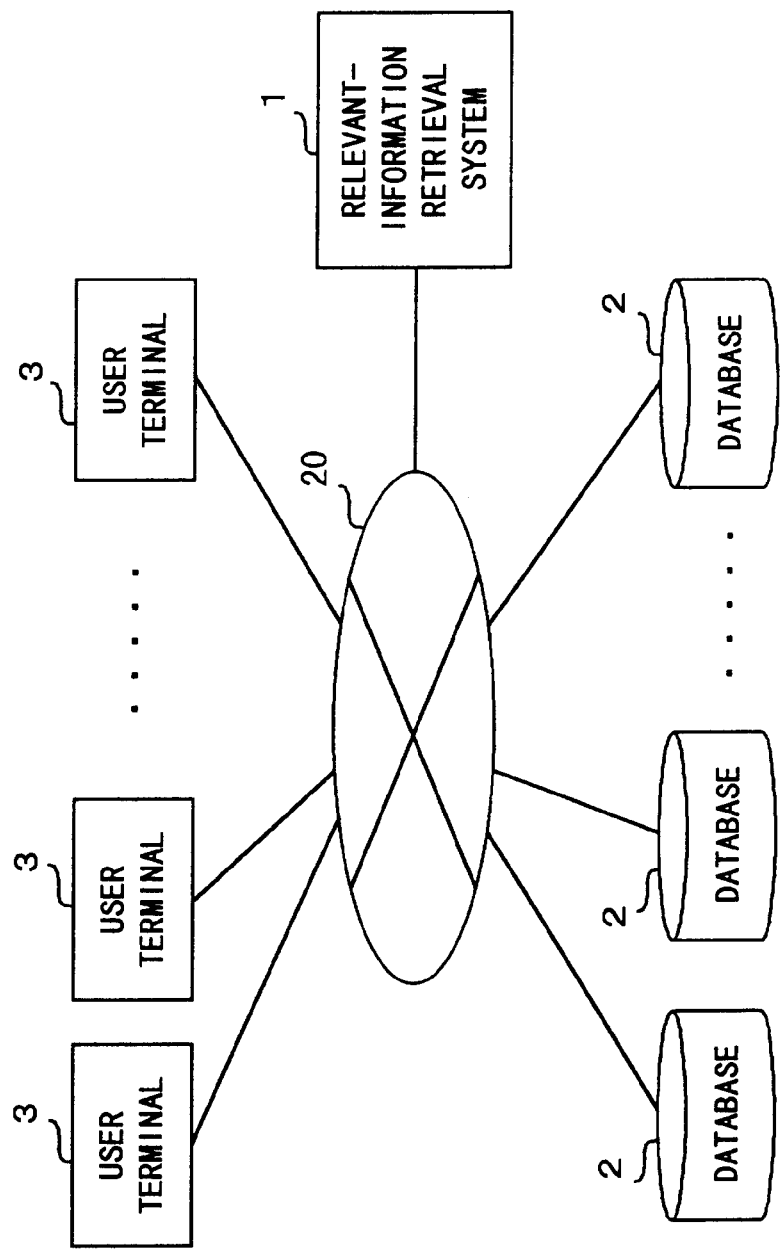
FIG. 2 is a diagram for explaining a database retrieval system.

Now, the aspects of performance of the present invention will be described in detail with reference to the drawings.

FIG. 1 illustrates the fundamental construction of the present invention.

A relevant-information retrieval system 1 based on the concept of the present invention governs a plurality of independent databases 2, and it presents or teaches information on the databases 2 which administer information relevant to information requested to be searched for, to a user terminal 3 which issues the search request.

The relevant-information retrieval system 1 according to the present invention comprises a search unit 10, a first management unit 11, a second management unit 12, an acquisition unit 13, a first generation unit 14, a second generation unit 15, a learning unit 16, a specification unit 17, and a presentation unit 18.

The search unit 10 searches the database 2 in response to the search request sent from the user terminal 3, and it sends the result of the search to the user terminal 3 as a reply.

The first management unit 11 manages an association model which describes the relevancy between two of the databases 2 in accordance with associative values defined between the databases 2. On the other hand, the second management unit 12 manages a database model which describes the relevancy between the databases 2 in accordance with a tree structure.

The acquisition unit 13 acquires information on the capabilities of the databases 2. That is, it acquires such information as the categories of the databases 2 or the categories of keywords employed for the databases 2.

The first generation unit 14 generates the association model in such a way that the associative value defined between the two databases 2 is calculated from the keyword information of the database 2 acquired by the acquisition unit 13. This unit 14 enters the generated association model into the first management unit 11. On the other hand, the second generation unit 15 generates the database model from the keyword information of the database 2 acquired by the acquisition unit 13 and enters the generated database model into the second management unit 12.

The learning unit 16 learns the associative values of the association model managed by the first management unit 11, so that the degree of association may enlarge with increase in the number of times which the associative value has been referred to by the issuing source of the search requests.

In a process for the search of a specified one of the databases 2, the specification unit 17 specifies the database 2 administering information relevant to the specified database 2, in accordance with the association model managed by the first management unit 11, or it specifies the database 2 administering information relevant to the specified database 2, in accordance with the database model managed by the second management unit 12. The presentation unit 18 presents the user terminal 3 the database information specified by the specification unit 17.

Here, the functions of the relevant-information retrieval system 1 according to the present invention are concretely implemented by a program. The program is stored in a floppy disk or the like, is stored in the disk or the like of a server or the like, or is installed in the relevant-information retrieval system 1 from such a disk, and it is run on a memory, thereby to incarnate the present invention.

In the relevant-information retrieval system 1 of the present invention thus constructed, the first generation unit 14 generates the association model describing the relevancy between the two databases 2, in the way that the associative value defining the degree of association between the two databases 2 is calculated using the keyword information of the database 2 acquired by the acquisition unit 13 and from, for example, the number of the keyword categories of the database 2 of an association destination, as well as the number of the keyword categories agreeing between the databases 2 of an association source and the association destination, whereupon the first generation unit 14 enters the generated association model into the first management unit 11. On this occasion, the first generation unit 14 sometimes calculates the associative value in consideration of a weight which depends upon the combination between a mandatory keyword category and an optional keyword category.

The association model which is generated in this way, describes the relevancy between the two databases 2 by bearing the associative value which enlarges as the relevancy becomes higher.

Upon receiving the association model managed by the first management unit 11, the specification unit 17 operates during the search of the certain database 2 by the search unit 10 to specify the database 2 which administers the information relevant to the certain database 2, in accordance with the association model.

By way of example, a plurality of associative routes corresponding to the depths of association (sometimes designated by the user terminal 3) are supposed with the certain database 2 as a starting point, and each of the associative routes is estimated from the associative value between the databases 2 and the distance between the databases 2 defined by the associative route. Thus, the specification unit 17 obtains the associative route exhibiting the largest estimated value or the plurality of associative routes exhibiting larger estimated values, thereby to specify the database 2 which administers the information relevant to the certain database 2.

Upon receiving the result of the specification, the presentation unit 18 presents the user terminal 3 with the database information specified by the specification unit 17. Thus, a searcher for the information is permitted to easily refer to the information necessary for him/her from among the wide variety of databases 2.

Besides, in the relevant-information retrieval system 1 of the present invention thus constructed, the second generation unit 15 generates the database model by the use of the keyword information of the database 2 acquired by the acquisition unit 13, the database model being constructed of the tree structure which consists of, for example, database management segments that are disposed in correspondence with the databases 2 and that manage the categories of the keywords employed for the databases 2, and category-database management segments that lie at positions above the database management segments in the tree structure and that manage the keyword categories managed by other management segments (database management segments or category-database management segments) governed by the category-database management segments themselves, whereupon the second generation unit 15 enters the generated database model into the second management unit 12.

The database model which is generated in this way, describes the relevancy between the databases 2 by indicating the databases 2 which have the same keyword category.

Upon receiving the database model managed by the second management unit 12, the specification unit 17 operates during the search of the certain database 2 by the search unit 10 to specify the database 2 which administers the information relevant to the certain database 2, in accordance with the database model.

By way of example, the tree structure of the database model is traced so as to specify the database 2 which contains the designated keyword category. Thus, the specification unit 17 specifies the database 2 which administers the relevant information.

Upon receiving the result of the specification, the presentation unit 18 presents the user terminal 3 with the database information specified by the specification unit 17. Thus, the information searcher is permitted to easily refer to the information necessary for him/her from among the wide variety of databases 2.

In this manner, according to the relevant-information retrieval system 1 of the present invention, in an environment where the heterogeneous databases 2 are united, it is permitted to offer the information searcher the information which is relevant to the information being currently searched for, with ease and in a refined and arranged form. By the way, in the ensuing description, the "keyword categories" shall be often expressed merely as the "keywords".

FIG. 2 illustrates an example of the system architecture of a database retrieval system to which the present invention is applied.

The database retrieval system shown in FIG. 2 is so constructed that the relevant-information retrieval system 1 of the present invention, a plurality of databases 2 (where actual information sources are managed in information domain units) and a plurality of user terminals 3 are interconnected through a network 20.

The relevant-information retrieval system 1 of the present invention acts as agent for processes for searching the heterogeneous databases 2 connected through the network 20, thereby to execute a process which causes the user terminal 3 to see the search processes as if a single virtual database were being searched. On this occasion, the relevant-information retrieval system 1 also executes a process for aiding the user terminal 3 to search for relevant information.

Figure 3:
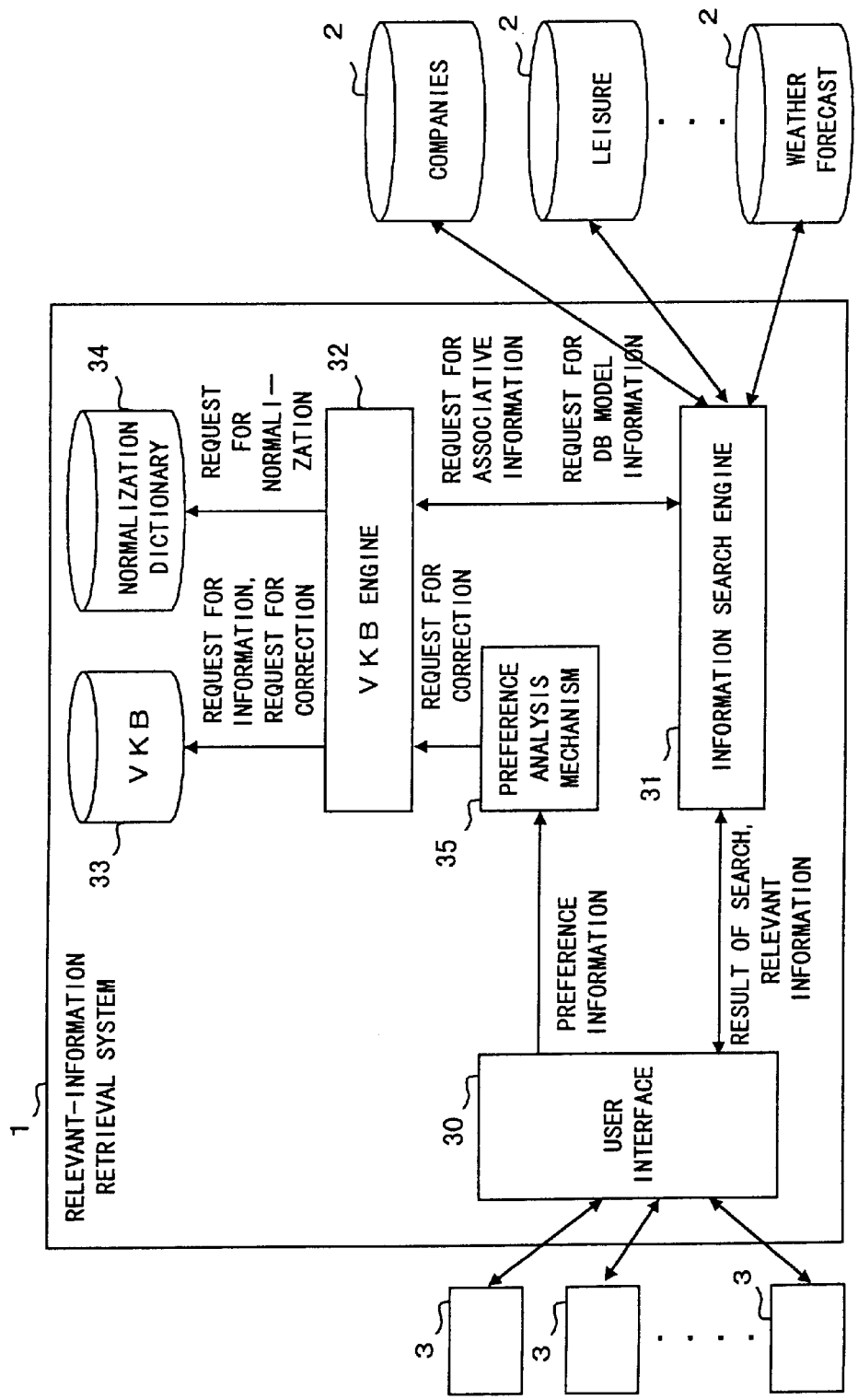
FIG. 3 is a block diagram showing an embodiment of a relevant-information retrieval system.

FIG. 3 illustrates one embodiment of the relevant-information retrieval system 1 of the present invention.

The relevant-information retrieval system 1 of the present invention in this embodiment comprises a user interface 30, an information search engine 31, a VKB (Virtual Knowledge Base) engine 32, a VKB 33, a normalization dictionary 34 and a preference analysis mechanism 35.

The user interface 30 executes the interface Ad processes between the retrieval system 1 and each user terminal 3, such as accepting a search request from a searcher for information and displaying a search result to the information searcher.

The information search engine 31 is constructed of a program which is installed from a floppy disk, a server or the like. It operates on the basis of the search request from the information searcher who searches databases 2, to issue a request for the acquisition of relevant information to the VKB engine 32, or to issue a request for the acquisition of the search sequence of the database 2.

A search request message, a search result message, etc. are exchanged between the user interface 30 and the information search engine 31.

The VKB engine 32 is constructed of a program which is installed from a floppy disk, a server or the like. Upon receiving the acquisition request for the relevant information or the acquisition request for the search sequence of the database 2 as issued by the information search engine 31, the VKB engine 32 refers to the VKB 33, thereby to obtain information on the database 2 administering the relevant information requested to be acquired or to obtain the search sequence of the database 2 requested to be acquired.

The messages of the request/result of the relevant information, the messages of the request/result of the search sequence, etc. are exchanged between the information search engine 31 and the VKB engine 32.

As will be stated later, the VKB 33 manages the relations of all information domains included in the group of databases 2, as a database model, and it also manages the relevancies among the information domains, as an associative dictionary (an association model). The database model and the associative dictionary are built up by the VKB engine 32. The messages of the operation or management of the database model or associative dictionary are sent from the VKB engine 32 to the VKB 33.

The normalization dictionary 34 is a term converting dictionary which is prepared for the creation of a search keyword domain that is generated by normalizing the terms of search keywords. By way of example, in a case where the terms of "names of companies" and "names of enterprises" are used, the normalization dictionary 34 serves to unify these terms into either of them. Herein, the term after the unification forms the search keyword domain. The message of a request for searching the normalized search keyword domain correspondent to the search keyword is sent from the VKB engine 32 to the normalization dictionary 34.

By the way, in the ensuing description, the "search keyword" and the "search keyword domain (the search keyword as normalized)" shall be called the "search keyword" without distinction for the sake of convenience. Although omitted from the ensuing description, a process for normalizing the term of the search keyword is executed by the use of the normalization dictionary 34 as may be needed.

The preference analysis mechanism 35 is constructed of a program which is installed from a floppy disk, a server or the like, and it learns the associative dictionary managed by the VKB 33, on the basis of associative information selected by the information searcher. A message for altering the associative dictionary is sent from the preference analysis mechanism 35 to the VKB 33.

Figure 4:
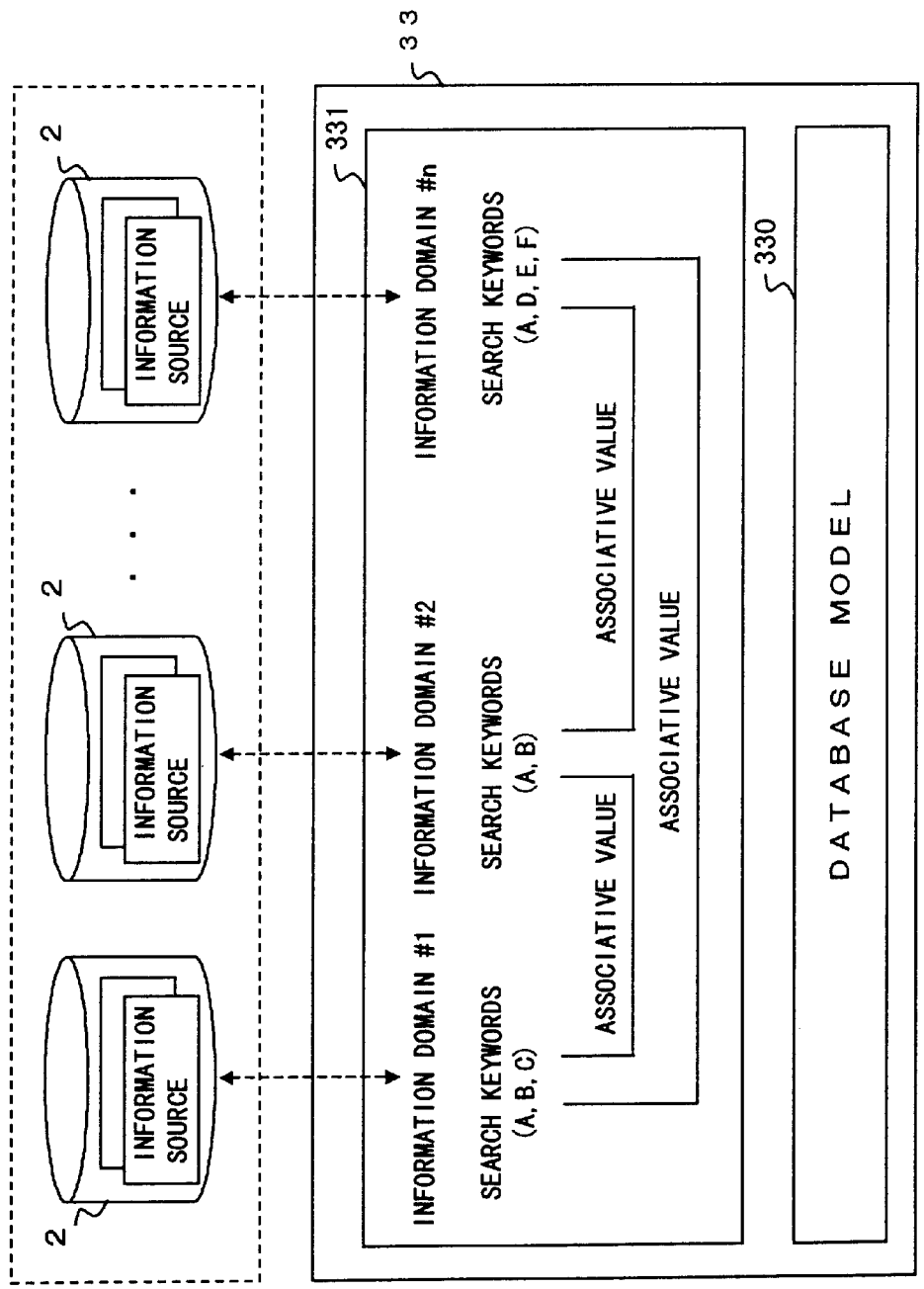
FIG. 4 is an arrangement diagram showing an embodiment of a VKB (Virtual Knowledge Base)

FIG. 4 illustrates one embodiment of the VKB 33.

As shown in FIG. 4, the VKB 33 expands a database model 330 and an associative dictionary 331 in order to implement a process for presenting relevant information to a user.

The database model 330 expanded in the VKB 33 manages the relations of all information domains included in a group of databases 2 which are to be searched. As shown in FIG. 5, the database model 330 is constructed of a tree structure including domain management segments 3300 which are disposed in correspondence with the information domains and which manage the category or categories of search keywords employed for the corresponding information domains, and category management segments 3301 which lie at higher levels of the tree structure than the domain management segments 3300 and which manage the search keyword categories managed by their governing management segments (the domain management segments 3300 or the different category management segment 3301).

Here, the database model 330 having the tree structure is concretely expressed by the following data structure:

DB category ([KW category]*)
   [[[DB category([KW category]*)]**]*]
      DB category: Category of Information domain
      KW category: Category of Search keyword.

Further, the database model 330 manages a search sequence in correspondence with each of the domain management segments 3300, the search sequence being required for the search of the information domain which pairs with the search sequence.

The search sequence is defined as follows:
[DB category](([KW category][Necessity]
   [Actual data][Logical operator])*,( . . . ))
DB category: Category of Information domain
KW category: Category of Search keyword
Necessity: Mandatory search keyword or Optional search keyword
Actual data: Entity of Search keyword
Logical operator: Logic between Search keywords The search sequences are described in the format common to the plurality of databases 2, and each of them is obtained from advertisement information which is sent from the database 2 (information domain) to the relevant-information retrieval system 1. When the search sequence has been obtained, the category of the search keywords of the database 2 (information domain) can also be known.

Here, the "mandatory search keyword" defined in the search sequence is a search keyword which is absolutely necessary for the search of the information domain. In the presence of a plurality of mandatory search keywords, the information domain can be searched when any one of these keywords is designated. On the other hand, the "optional search keyword" is a search keyword for designating information which is not designated by the mandatory search keyword. The information domain can be searched even when the optional search keyword is not designated. Whether the search keyword is mandatory or optional, is determined by a person who has created the database 2.

The database model 330 will be concretely explained. An embodiment of the database model 330 as shown in FIG. 6 is prepared in an example where "X Database Service Company" offers as subjects for their services that information domain administering financial information whose mandatory search keyword is the name of a company, that information domain administering director information whose mandatory search keyword is the name of a person and whose optional search keyword is the name of a company, and that information domain administering map information whose mandatory search keyword is an address.

In other words, the database model 330 to be prepared includes a domain management segment 3300a which is disposed in correspondence with the information domain administering the financial information and which manages the search keyword category of the "Names of Companies" and the search sequence of "Financial information ([Names of Companies][Mandatory][Actual data][NULL])", a domain management segment 3300b which is disposed in correspondence with the information domain administering the director information and which manages the search keyword categories of the "Names of Companies" and the "Names of Persons" and the search sequence of "Director information ([Names of Companies][Optional][Actual data][&/][Names of Persons][Mandatory][Actual data])", a domain management segment 3300c which is disposed in correspondence with the information domain administering the map information and which manages the search keyword category of "Addresses" and the search sequence of "Map information ([Addresses][Mandatory][Actual data][NULL])", a category management segment 3301a which lies at a higher level of a tree structure than the domain management segments 3300a and 3300b and which manages the search keyword categories of the "Names of Companies" and "Names of Persons", and a category management segment 3301b which lies at a higher level of the tree structure than the category management segment 3301a and the domain management segment 3300c and which manages the search keyword categories of the "Names of Companies", "Names of Persons" and "Addresses".

Figure 6:
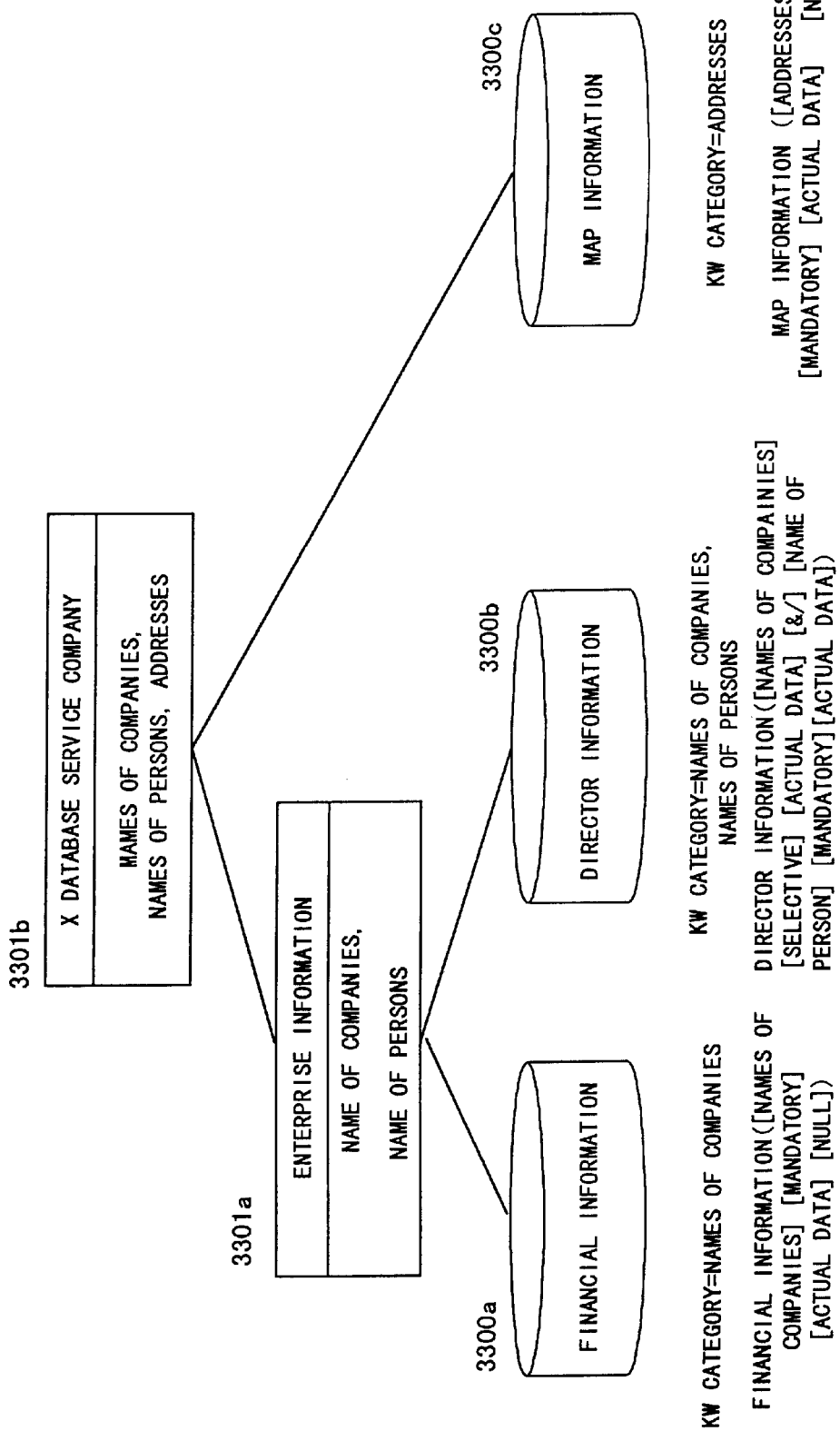
FIG. 6 is a structural diagram showing the second embodiment of the database model.

Incidentally, the database model 330 shown in FIG. 6 is expressed in accordance with the foregoing descriptive format, as follows:

X Database Service Company (Names of Companies, Names of Persons, Addresses)[
   Enterprise information (Names of Companies, Names of Persons)[
      Financial information (Names of Companies),
      Director information (Names of Companies, Names of Persons)],
   Map information (Addresses)].

On the other hand, the associative dictionary 331 expanded in the VKB 33 manages the relevancies among the information domains in accordance with the associative values which are assigned between two information domains as shown in FIG. 4. The associative values are directional, and are calculated from the search keywords of the information domains by the VKB engine 32.

Next, methods for deriving the associative values will be explained.

The associative values which are assigned between the information domains, are calculated in consideration of the mandatory and optional search keywords of the information domains and in accordance with, for example, a calculational value "Associative value=n/N" from the number of agreement n between the search keywords of the information domains of an association source and an association destination and the number N of the search keywords of the information domain of the association destination.

Figure 7:
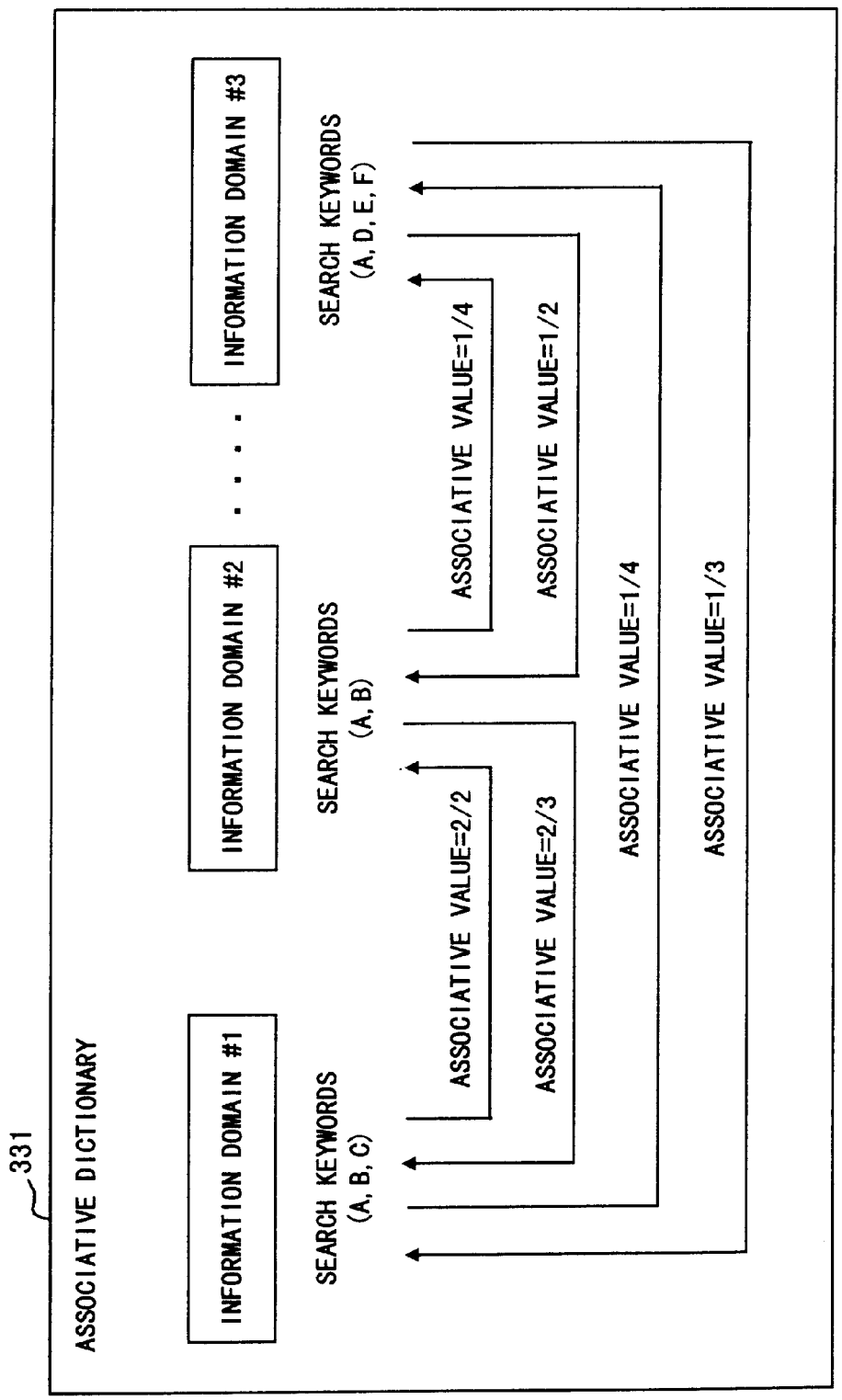
FIG. 7 is a diagram for explaining the first set of associative values.

More specifically, in a case as shown in FIG. 7 where the information domain #1 becomes the association source, while the information domain #2 becomes the association destination, under the condition that the former #1 has the search keywords of (A, B, C), while the latter #2 has the search keywords of (A, B), the associative value of "1" is calculated in accordance with the numbers "n=2, N=2". Conversely, in a case where the information domain #2 becomes the association source, while the information domain #1 becomes the association destination, the associative value of "2/3" is calculated in accordance with the numbers "n=2, N=3".

The associative value which is calculated by this method of derivation, enlarges more as the number of the agreeing search keywords is larger and also enlarges more as the number of the search keywords of the association destination is smaller.

With this method for deriving the associative value, weights are not considered for the mandatory and optional search keywords as regards the agreeing search keywords. It is also possible, however, to calculate the associative value in consideration of the weights.

As exemplified in FIG. 8, the weight of "α" is set when the agreeing search keyword is mandatory in the association source and is also mandatory in the association destination. In addition, the weight of "β" is set when the agreeing search keyword is mandatory in the association source and is optional in the association destination. Besides, the weight of "γ" is set when the agreeing search keyword is optional in the association source and is mandatory in the association destination. Further, the weight of "δ" is set when the agreeing search keyword is optional in the association source and is also optional in the association destination.

Figure 9:
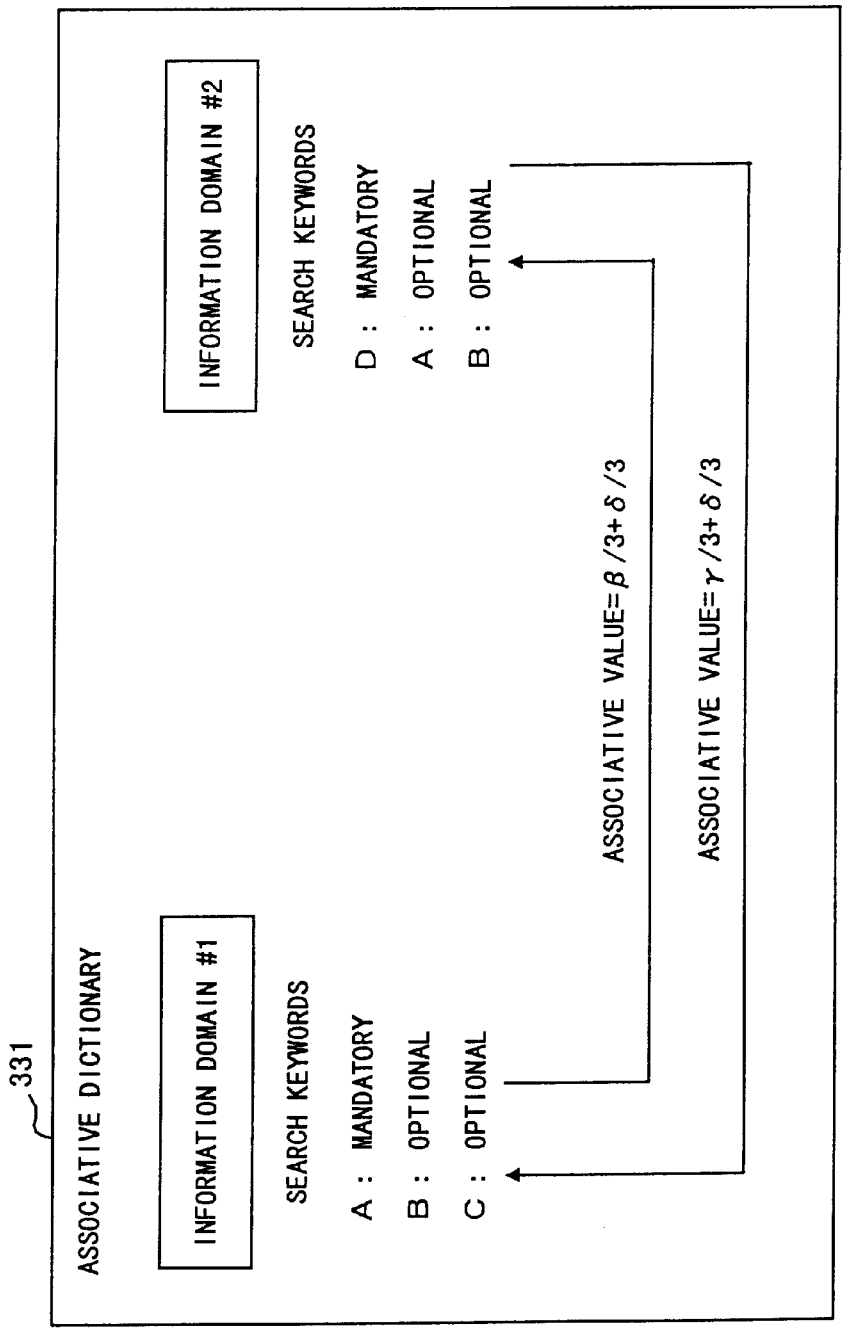
FIG. 9 is a diagram for explaining the second set of associative values.

More specifically, in a case as shown in FIG. 9 where the information domain #1 becomes the association source, while the information domain #2 becomes the association destination, under the condition that the former #1 has a mandatory search keyword A and optional search keywords B, C, while the latter #2 has a mandatory search keyword D and optional search keywords A, B, the associative value of "β/3+δ/3" is calculated in accordance with the numbers "n=2, N=3", the weight "β" of the agreeing search keyword A, and the weight "δ" of the agreeing search keyword B. Conversely, in a case where the information domain #2 becomes the association source, while the information domain #1 becomes the association destination, the associative value of "γ/3+δ/3" is calculated in accordance with the numbers "n=2, N=3", the weight "γ" of the agreeing search keyword A, and the weight "δ" of the agreeing search keyword B.

In other words, with this method for deriving the associative value, the associative value is calculated as to the search keywords agreeing between the association source and the association destination, in accordance with the following formula:

Degree of Association=Σ(Weight/Number of Search keywords of Association destination)

The preference analysis mechanism 35 executes a process for learning the preference of the user (the information searcher), in such a way that the associative value as calculated by the VKB engine 32 is altered in accordance with the information domain of the association destination selected by the user.

Figure 10:
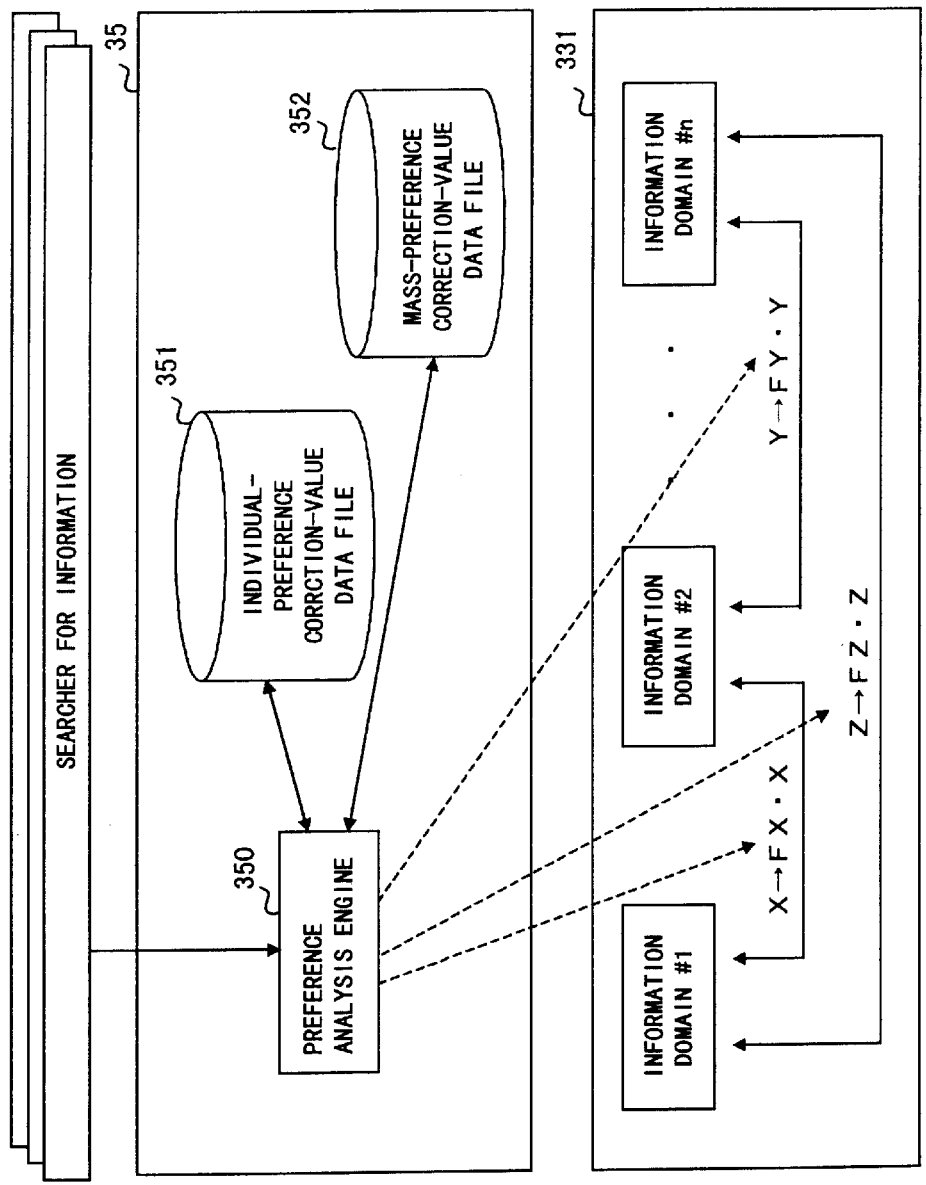
FIG. 10 is a diagram for explaining a learning process for the associative values.

FIG. 10 illustrates the learning process for the associative value. The preference analysis mechanism 35 shown in FIG. 10 includes a preference analysis engine 350, an individual-preference correction-value data file 351 and a mass-preference correction-value data file 352.

The preference analysis engine 350 operates, for example, to count up and update the number of times M of reference of "Information domain #1 (Association source) to Information domain #2 (Association destination)" upon detecting that the user has referred to the information domain #2 during his/her search of the information domain #1.

Using the number of times M of reference, the preference analysis engine 350 alters the associative value X of "Information domain #1 (Association source) to Information domain #2 (Association destination)" calculated by the VKB engine 32 and entered into the associative dictionary 331, in accordance with the following formula by way of example:

New associative value=FX·X=log$_2$M·X

Thus, the preference of the user is learnt so as to enlarge the associative value with an increase in the number of times of reference by the user. Here, when the formula is used, the initial value of the number of times M is set at "2".

The number of times M of reference updated on this occasion is stored in the individual-preference correction-value data file 351 and the mass-preference correction-value data file 352. Here, the individual-preference correction-value data file 351 is used in case of calculating the associative values of the respective users, and it manages the numbers of times of reference by the respective users. On the other hand, the mass-preference correction-value data file 352 is used in case of calculating the associative values without distinction of the users, and it manages the numbers of times of reference by all the users.

Next, the processes of the present invention concerning the associative dictionary 331 will be described in conjunction with processing flows illustrated in FIGS. 11, 12 and 13.

Figure 12:
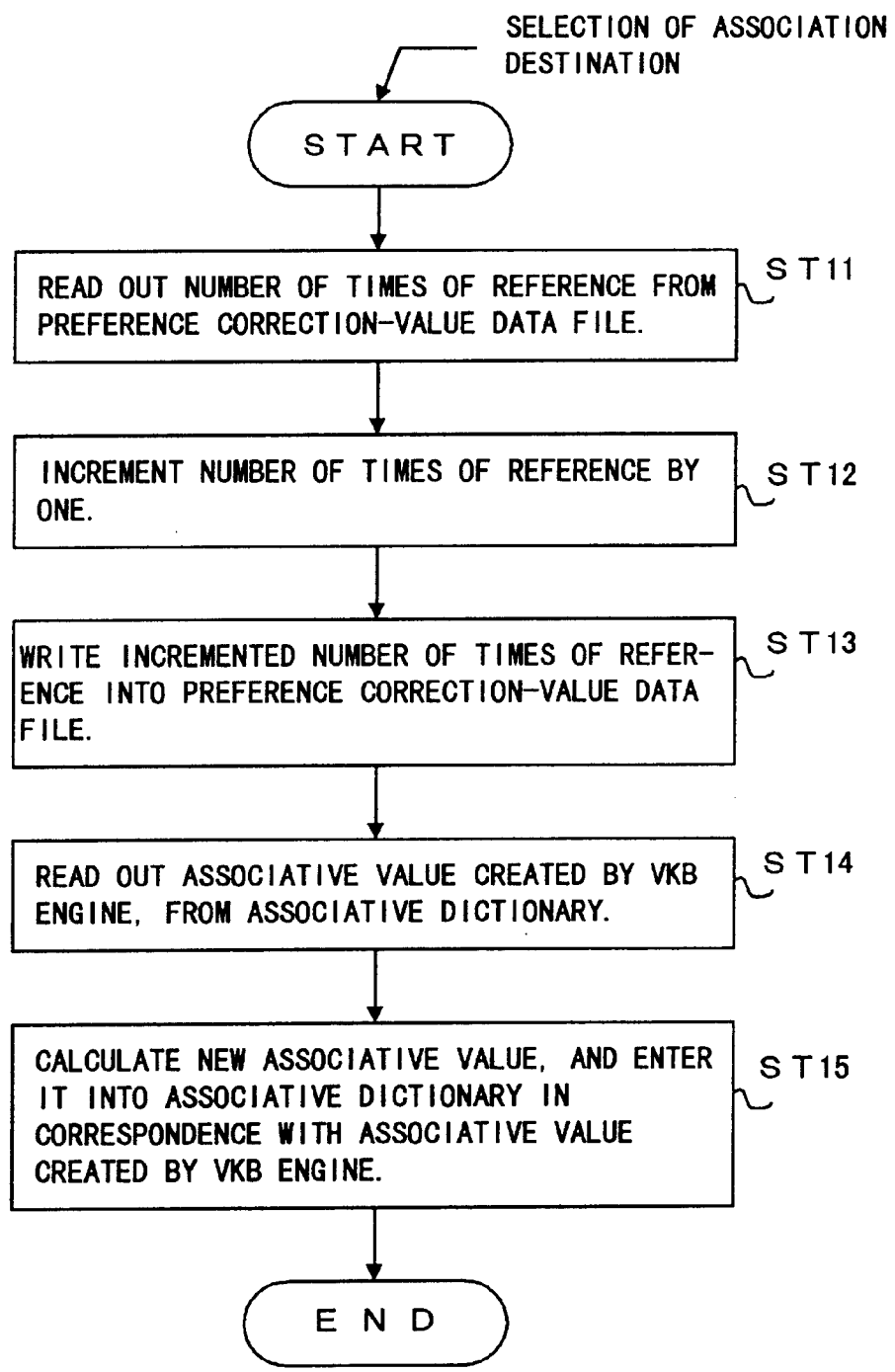
FIG. 12 is a flow chart showing a process which is executed by a preference analysis engine.
Figure 13:
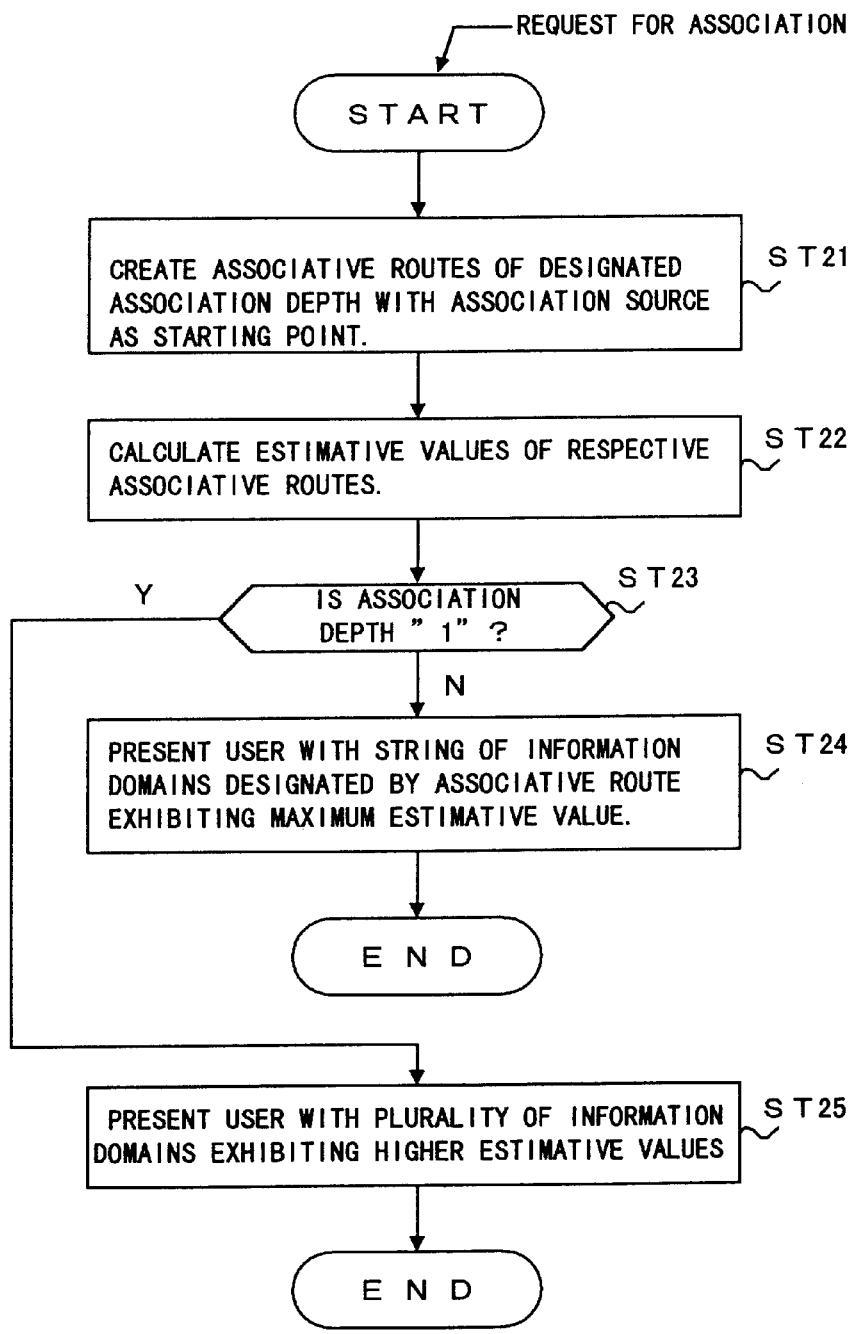
FIG. 13 is a flow chart showing a second process which is executed by the VKB engine.

Here, the processing flow shown in FIG. 11 is executed when the VKB engine 32 builds up the associative dictionary 331, the processing flow shown in FIG. 12 is executed when the preference analysis engine 350 learns the preference of the user and matches the associative value of the associative dictionary 331 to the preference of the user, and the processing flow shown in FIG. 13 is executed when the VKB engine 32 offers relevant information by the use of the associative dictionary 331.

When a request for building up the associative dictionary 331 has been issued, the VKB engine 32 first sets initial values "1" for variables i and k at a step ST1 as shown in the processing flow of FIG. 11. Subsequently, at a step ST2, the VKB engine 32 accesses the database model 330 managed by the VKB 33, thereby to make a comparison between the search keywords of the ith information domain pointed to by the variable i and those of the (i+k)th information domain pointed to by the variables i and k. At the next step ST3, the VKB engine 32 judges whether or not any of the search keywords of both the information domains agrees.

When any of the search keywords of both the information domains agrees at the step ST3, the processing flow proceeds to a step ST4, at which the VKB engine 32 operates as stated below. The ith information domain is set as an association source, while the (i+k)th information domain is set as an association destination. Using the weights which are defined by the combinations of the mandatory and optional search keywords as explained with reference to FIG. 8, on the basis of the attributes (mandatory/optional) of the search keywords agreeing between the information domains of the association source and association destination, as well as the number of the search keywords of the information domain of the association destination, the VKB engine 32 calculates the degree of association in accordance with the following formula:

Degree of Association=Σ(Weight/Number of Search keywords of Association destination)

The calculated degree of association is entered into the associative dictionary 331.

More specifically, as explained with reference to FIG. 9, in the exemplified case where the information domain #1 becomes the association source, while the information domain #2 becomes the association destination, under the condition that the former #1 has the mandatory search keyword A and the optional search keywords B, C, while the latter #2 has the mandatory search keyword D and the optional search keywords A, B, the associative value of "β/3+δ/3" is calculated in accordance with the numbers "n=2, N=3", the weight "β" of the agreeing search keyword A, and the weight "δ" of the agreeing search keyword B, and the calculated associative value is entered into the associative dictionary 331.

Subsequently, at a step ST5, the (i+k)th information domain is set as an association source, while the ith information domain is set as an association destination. Using the weights which are defined by the combinations of the mandatory and optional search keywords as explained with reference to FIG. 8, on the basis of the attributes (mandatory/optional) of the search keywords agreeing between the information domains of the association source and association destination, as well as the number of the search keywords of the information domain of the association destination, the VKB engine 32 calculates the degree of association in accordance with the following formula:

Degree of Association=Σ(Weight/Number of Search keywords of Association destination)

The calculated degree of association is entered into the associative dictionary 331.

More specifically, as explained with reference to FIG. 9, in the exemplified case where the information domain #2 becomes the association source, while the information domain #1 becomes the association destination, under the condition that the latter #1 has the mandatory search keyword A and the optional search keywords B, C, while the former #2 has the mandatory search keyword D and the optional search keywords A, B, the associative value of "γ/3+δ/3" is calculated in accordance with the numbers "n=2, N=3", the weight "γ" of the agreeing search keyword A, and the weight "δ" of the agreeing search keyword B, and the calculated associative value is entered into the associative dictionary 331.

Subsequently, the value of the variable k is incremented by one at a step ST6, followed by a step ST7 which serves to judge whether or not the sum of the variables i and k exceeds the total number of the information domains. Subject to the judgement that the total number is not exceeded, the processing flow returns to the step ST2.

Meanwhile, when any of the search keywords of both the information domains does not agree at the step ST3, the processing flow immediately proceeds to the step ST6, at which the value of the variable k is incremented by one. As stated above, the subsequent step ST7 serves to judge whether or not the sum of the variables i and k exceeds the total number of the information domains, and it is followed by the step ST2 subject to the judgement that the total number is not exceeded.

On condition that the sum of the variables i and k exceeds the total number of the information domains as the judgement of the step ST7, the processing flow proceeds to a step ST8, at which the value of the variable i is incremented by one. The next step ST9 serves to judge whether or not the value of the variable i is less than the total number of the information domains. When the value of the variable i is less than the total number, the initial value "1" is set for the variable k at the subsequent step ST10, whereupon the processing flow returns to the step ST2. On the other hand, when the value of the variable i is equal to or greater than the total number, the illustrated process is terminated.

Figure 15:
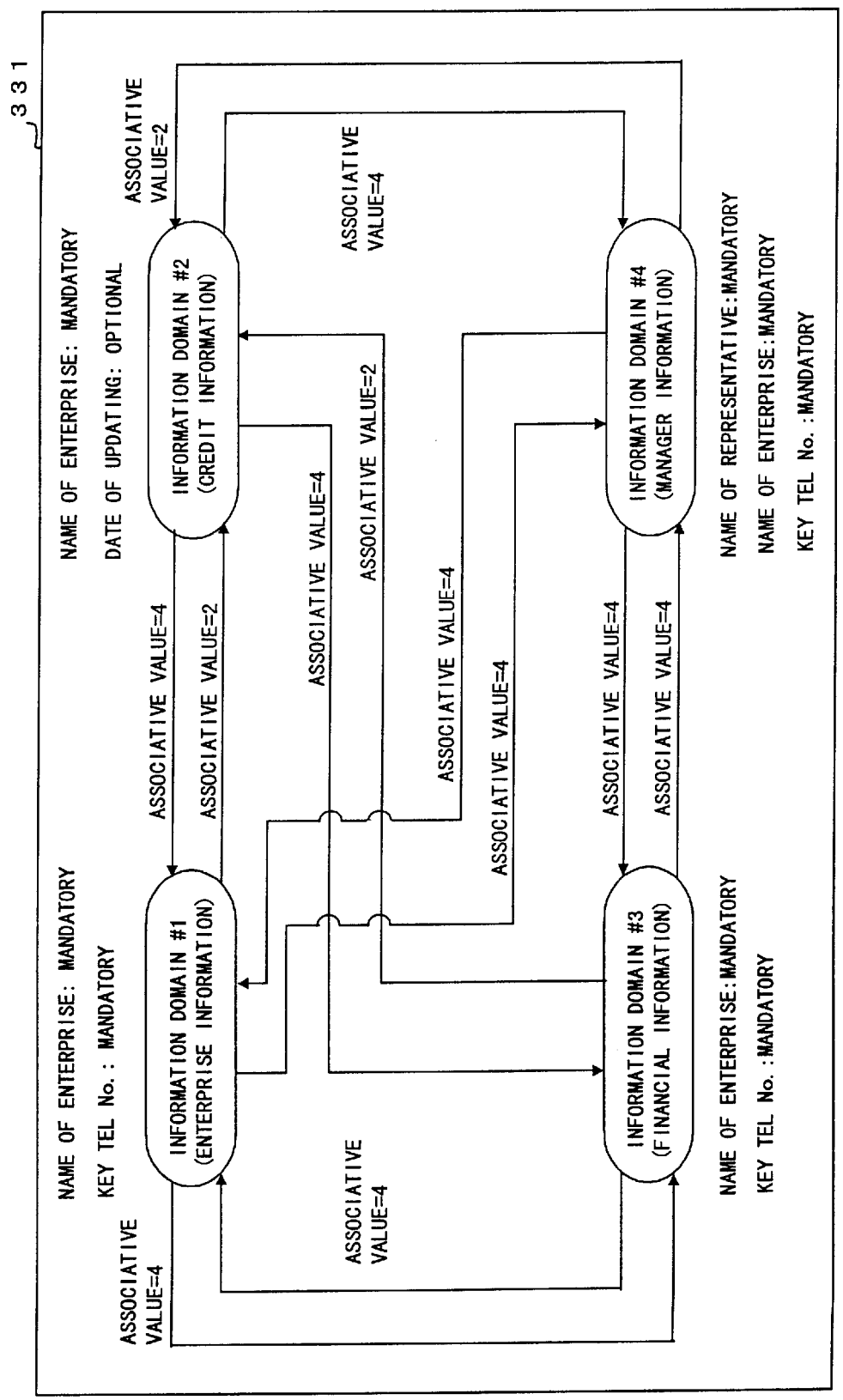
FIG. 15 is a diagram showing an example of an associative dictionary.

As a concrete example, let's consider a case where weights as indicated in FIG. 14 are set for the combinations between mandatory and optional search keywords and where, as illustrated in FIG. 15, an information domain #1 administering enterprise information, an information domain #2 administering credit information, an information domain #3 administering financial information, and an information domain #4 administering manager information have the following categories of search keywords:

Keywords of Information domain #1: Name of Enterprise (Mandatory), Key telephone No. (Mandatory)

Keywords of Infonnation domain #2: Name of Enterprise (Mandatory), Date of Updating (Optional)

Keywords of Information domain #3: Name of Enterprise (Mandatory), Key telephone No. (Mandatory)

Keywords of Information domain #4: Name of Representative (Mandatory), Name of Enterprise (Mandatory), Key telephone No. (Mandatory)

In this case, the VKB engine 32 builds up the associative dictionary 331 by calculating associative values listed below:

| | |
|---|---|
| Info domain #1 to Info domain #2 | Associative value = 2 |
| Info domain #2 to Info domain #1 | Associative value = 4 |
| Info domain #1 to Info domain #3 | Associative value = 4 |
| Info domain #3 to Info domain #1 | Associative value = 4 |
| Info domain #1 to Info domain #4 | Associative value = 4 |
| Info domain #4 to Info domain #1 | Associative value = 4 |
| Info domain #2 to Info domain #3 | Associative value = 4 |
| Info domain #3 to Info domain #2 | Associative value = 2 |
| Info domain #2 to Info domain #4 | Associative value = 4 |
| Info domain #4 to Info domain #2 | Associative value = 2 |
| Info domain #3 to Info domain #4 | Associative value = 4 |
| Info domain #4 to Info domain #3 | Associative value = 4 |

The process for calculating these associative values will be explained. If any mandatory search keywords are designated, the corresponding information domain can be searched. In this example, therefore, when a plurality of mandatory search keywords are employed for the information domain, they are collectively reckoned as "one". Accordingly, the numbers of the search keywords of the information domains #1, #3 and #4 become "1", and the number of the search keywords of the information domain #2 becomes "2". By way of example, consequently, the associative value of the aspect of reference "Information domain #1 to Information domain #2" is found as "4/2=2" because of the agreeing mandatory search keyword (name of enterprise), and the associative value of the aspect of reference "Information domain #2 to Information domain #1" is found as "4/1=4" because of the agreeing mandatory search keyword (name of enterprise). Besides, in a case where a plurality of mandatory search keywords agree between two information domains, the associative value is calculated by regarding that one of them agrees.

As stated before, the preference analysis engine 350 executes the process in which the associative values of the associative dictionary 331 thus built up are corrected so as to meet the preference of the user.

More specifically, the preference analysis engine 350 executes a routine as shown in the processing flow of FIG. 12, when the user has selected and referred to "Credit information" as the association destination during his/her search for "Financial information". At the first step ST11, the number of times of reference corresponding to the particular aspect of reference (Association source to Association destination) is read out of the individual-preference correction-value data file 351 shown in FIG. 10 (or out of the mass-preference correction-value data file 352 when the preferences of the individual users are not corrected).

Subsequently, at a step ST12, the number of times of reference read out is incremented by one in conformity with the current reference. At the next step ST13, the incremented number of times of reference is written into the individual-preference correction-value data file 351 (or the mass-preference correction-value data file 352).

Further, at a step ST14, the associative value corresponding to the aspect of reference is read out of the associative dictionary 331. At the next step ST15, a new associative value is calculated by the use of the read associative value X and the incremented number of times M of reference and in accordance with, for example, the following formula:

$$\text{New associative value} = \log_2 M \cdot X$$

This new associative value is stored in the associative dictionary 331 in correspondence with the associative value calculated by the VKB engine 32. Then, the illustrated process is ended.

When the preference analysis engine 350 is disposed, the associative value calculated by this preference analysis engine 350 and stored in the associative dictionary 331 is employed for the association process, instead of the associative value calculated by the VKB engine 32 and stored in the associative dictionary 331.

Alternatively, the associative dictionary 331 may well be copied in the data file 351 (or the data file 352) beforehand so as to rewrite the copied associative value into a new associative value.

In this way, the preference analysis engine 350 corrects the associative value so as to enlarge more with increase in the number of times of reference by the user, thereby to learn the preference of the user.

Next, the association process which is executed using the associative dictionary 331 will be explained with reference to the processing flow illustrated in FIG. 13.

The VKB engine 32 executes a routine as shown in the processing flow of FIG. 13, when the user has issued a request for presenting relevant information by utilizing the associative dictionary 331, during his/her search of a certain information domain. At the first step ST21, associative routes each having the depth of association designated by the user are created with the information domain of an association source as a starting point.

By way of example, let's consider a case where the four information domains shown in FIG. 15 are existent, and where the user has issued an association request by designating "2" as the depth of association, during his/her reference to the financial information of a certain enterprise. In this case, the VKB engine 32 creates the following six associative routes:

Info domain #3→Info domain #1→Info domain #2
Info domain #3→Info domain #1→Info domain #4
Info domain #3→Info domain #2→Info domain #1
Info domain #3→Info domain #2→Info domain #4
Info domain #3→Info domain #4→Info domain #1
Info domain #3→Info domain #4→Info domain #2.

Here, the depth of association can also be prescribed by the relevant-information retrieval system 1.

Subsequently, the VKB engine 32 calculates the estimative values of the created associative routes at a step ST22. Here, the associative values of associative route units at the same levels of the respective associative routes are compared so as to set association ranks in the associative route units, and to assign association rank values in the order of the set association ranks. Besides, distances corresponding to the levels of the associative route units are set. Under these conditions, each estimative value is calculated in accordance with the following formula:

$$\text{Estimative value} = \Sigma(\text{Association rank value} \times \text{Distance}^{-2})$$

More specifically, the "associative route unit" signifies the combination between the association source and the association destination, and it is described as "Association source→Association destination". By way of example, the above-mentioned associative route "Information domain #3→Information domain #1→Information domain #2" consists of the associative route unit "Information domain #3→Information domain #1" at the first level and the associative route unit "Information domain #1→Information domain #2" at the second level. Further, regarding the associative route units at the identical level, a larger association rank value is given to the associative route unit of higher association rank.

Figure 16:
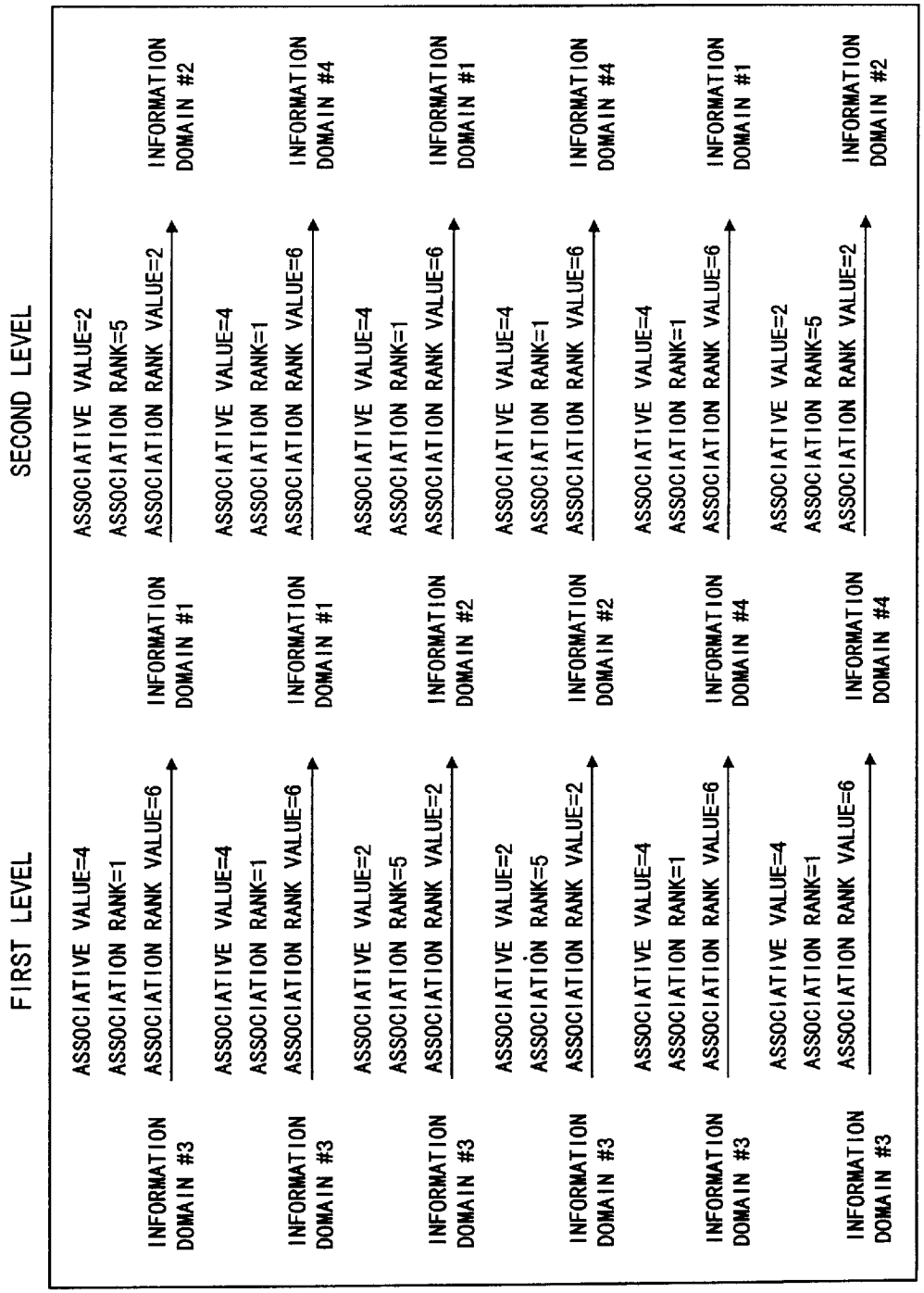
FIG. 16 is a diagram for explaining associative routes.

In the example of FIG. 15, association ranks and association rank values corresponding to the associative values are respectively given to the six associative route units of the first level and the six associative route units of the second level as indicated in FIG. 16.

On this occasion, in a case where a plurality of associative route units of identical rank are existent at the identical level, a value which is obtained by adding the number of these associative route units to the identical rank is used as the next association rank. Besides, the total number "6" of the associative routes is given as the association rank value to the associative route units which have the first association rank. Here, in the case where the plurality of associative route units of identical rank are existent at the identical level, a value which is obtained by subtracting the number of these associative route units from the association rank value of the identical rank is used as the association rank value of the next rank.

Moreover, the distance "Level value+1" is set for each level of the associative routes. Accordingly, assuming that the level values of the first level and second level be "1" and "2", respectively, the distance "2" is set for the associative route units at the first level having the level value "1", and the distance "3" is set for the associative route units at the second level having the level value "2".

By way of example, since the associative route unit "Information domain #3→Information domain #1" belonging to the associative route "Information domain #3→Information domain #1→Information domain #2" has the association rank "1", the association rank value "6" is assigned to this associative route unit. Also, since this associative route unit "#3→#1" is at the first level, the distance "2" is set therefor. Further, the associative route unit "Information domain #1→Information domain #2" belonging to the associative route "#3→#1→#2" has the association rank "5" and the association rank value "2" assigned thereto. Also, since this associative route unit "#1→#2" is at the second level, the distance "3" is set therefor. Thus, as indicated in FIG. 17, the estimative value of this associative route "#3→#1→#2" is calculated to be:

$$6/4+2/9=1.722$$

Likewise, as tabulated in FIG. 17, the estimative value of the associative route "Information domain #3→Information domain #1→Information domain #4" is calculated to be "2.167", that of the associative route "Information domain #3→Information domain #2→Information domain #1" is calculated to be "1.167", that of the associative route "Information domain #3→Information domain #2→Information domain #4" is calculated to be "1.167", that of the associative route "Information domain #3→Information domain #4→Information domain #1" is calculated to be "2.167", and that of the associative route "Information domain #3→Information domain #4→Information domain #2" is calculated to be "1.722".

Figure 18:
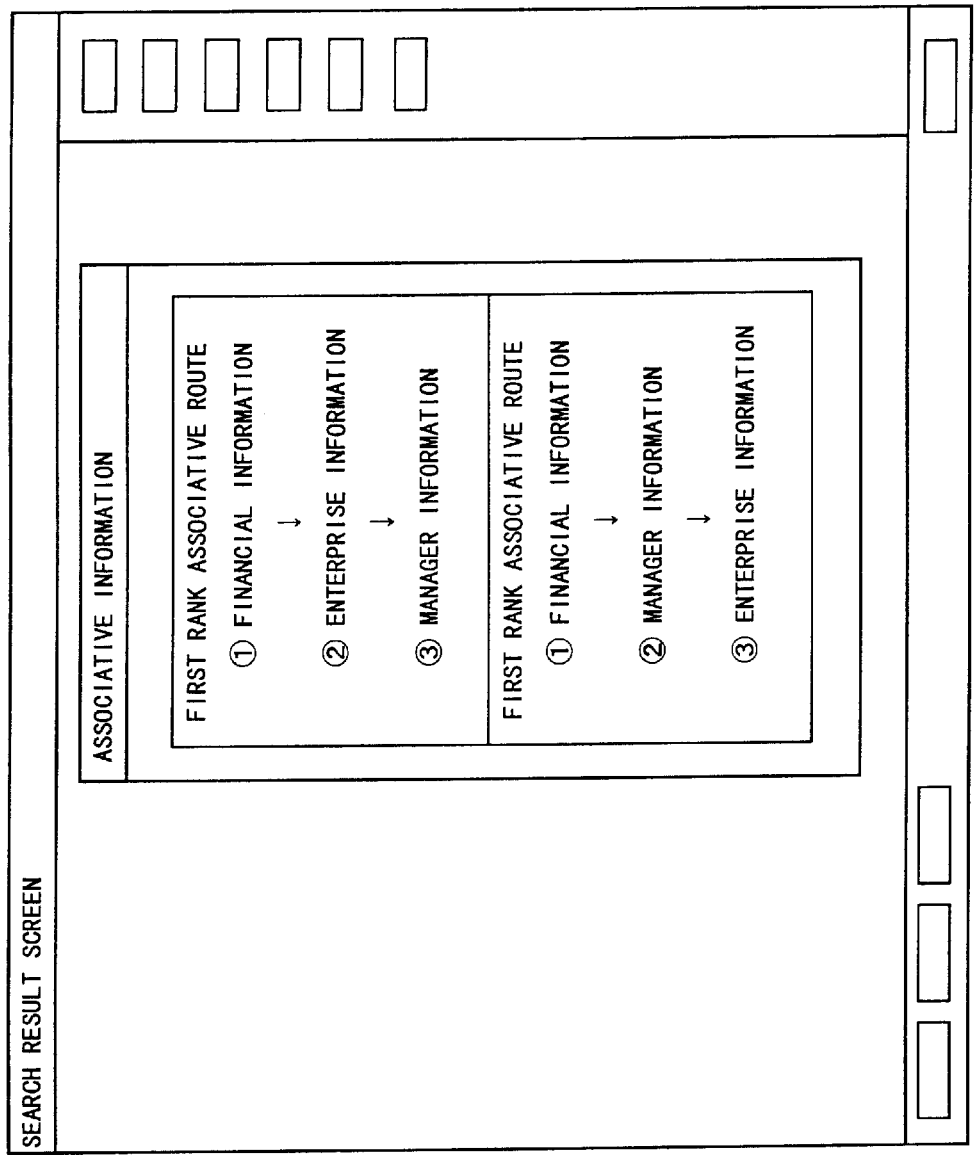
FIG. 18 is a diagram for explaining the first associative-information display screen.

Referring back to FIG. 13, after the estimative values of the respective associative routes have been calculated at the step ST22, whether or not the depth of association designated by the user is "1" is judged at a step ST23. When the depth of association is not "1", the processing flow proceeds to a step ST24, at which the VKB engine 32 operates to indicate a string of information domains determined by the associative routes exhibiting the maximum estimative value, on a display screen through the information search engine 31. More specifically, regarding the example of FIG. 17, the string of information domains determined by the following two associative routes which have the maximum estimative value "2.167" is indicated on the display screen as shown in FIG. 18:

Info domain #3→Info domain #1→Info domain #4
Info domain #3→Info domain #4→Info domain #1.

Figure 19:
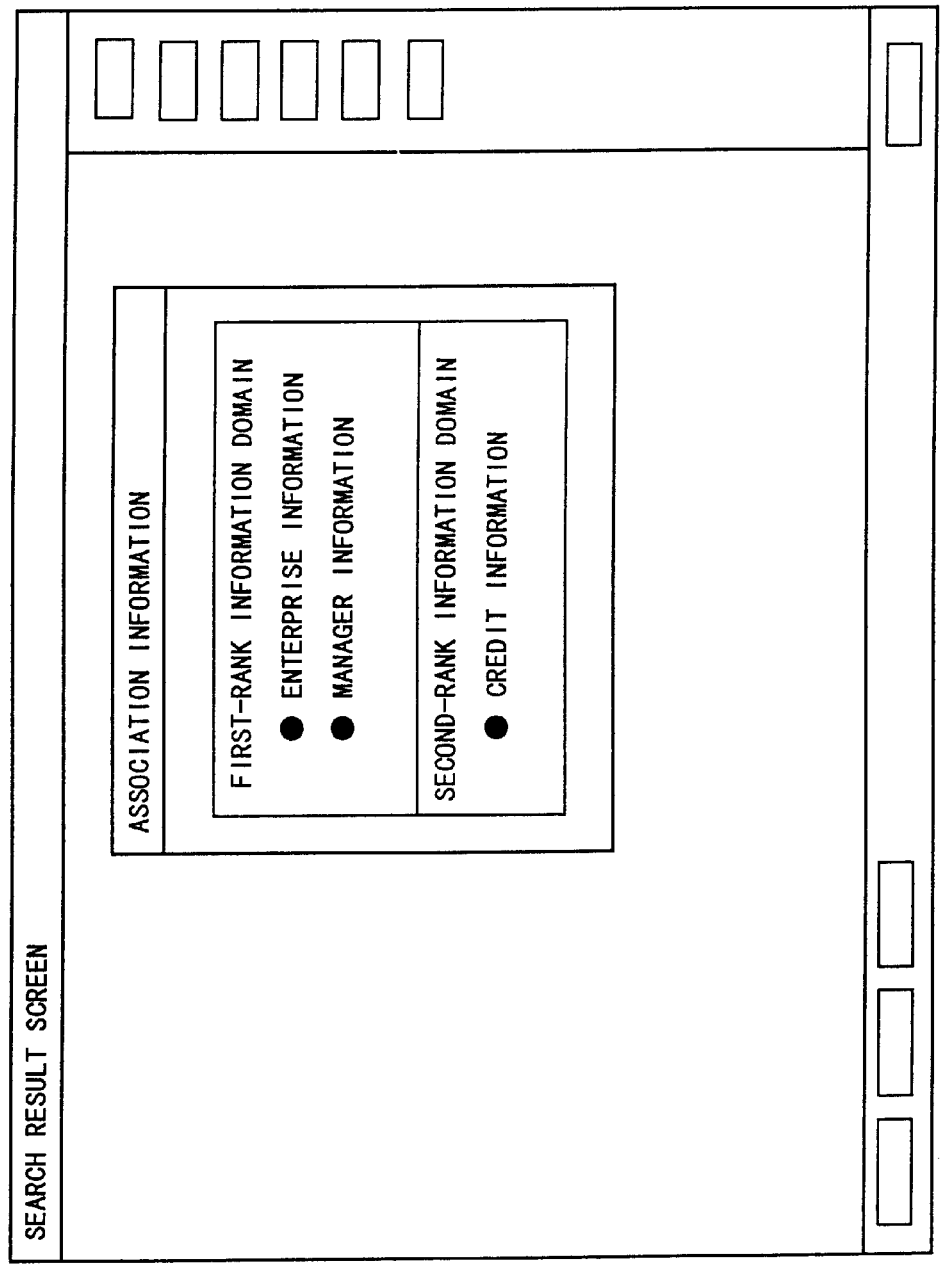
FIG. 19 is a diagram for explaining the second associative-information display screen.

On the other hand, when the depth of association designated by the user is judged "1" at the step ST23, that is, when the user designates association down to the next information domains joined to the information domain being the starting point, the processing flow proceeds to a step ST25, at which the VKB engine 32 operates to indicate the list of a plurality of information domains having higher estimative value (or the list of all the information domains having the estimative values), on the display screen through the information search engine 31 so that the information domains of the list may be arrayed in the order of the magnitudes of the estimative values as shown in FIG. 19. Here, the retrieval system 1 may well be constructed so as to display only the information domains having the maximum estimative value.

Further, the display of the associated information domains may well be so contrived that the values of information searched for in the association source are automatically set as the search keywords of the information domain being the association destination.

Figure 20:
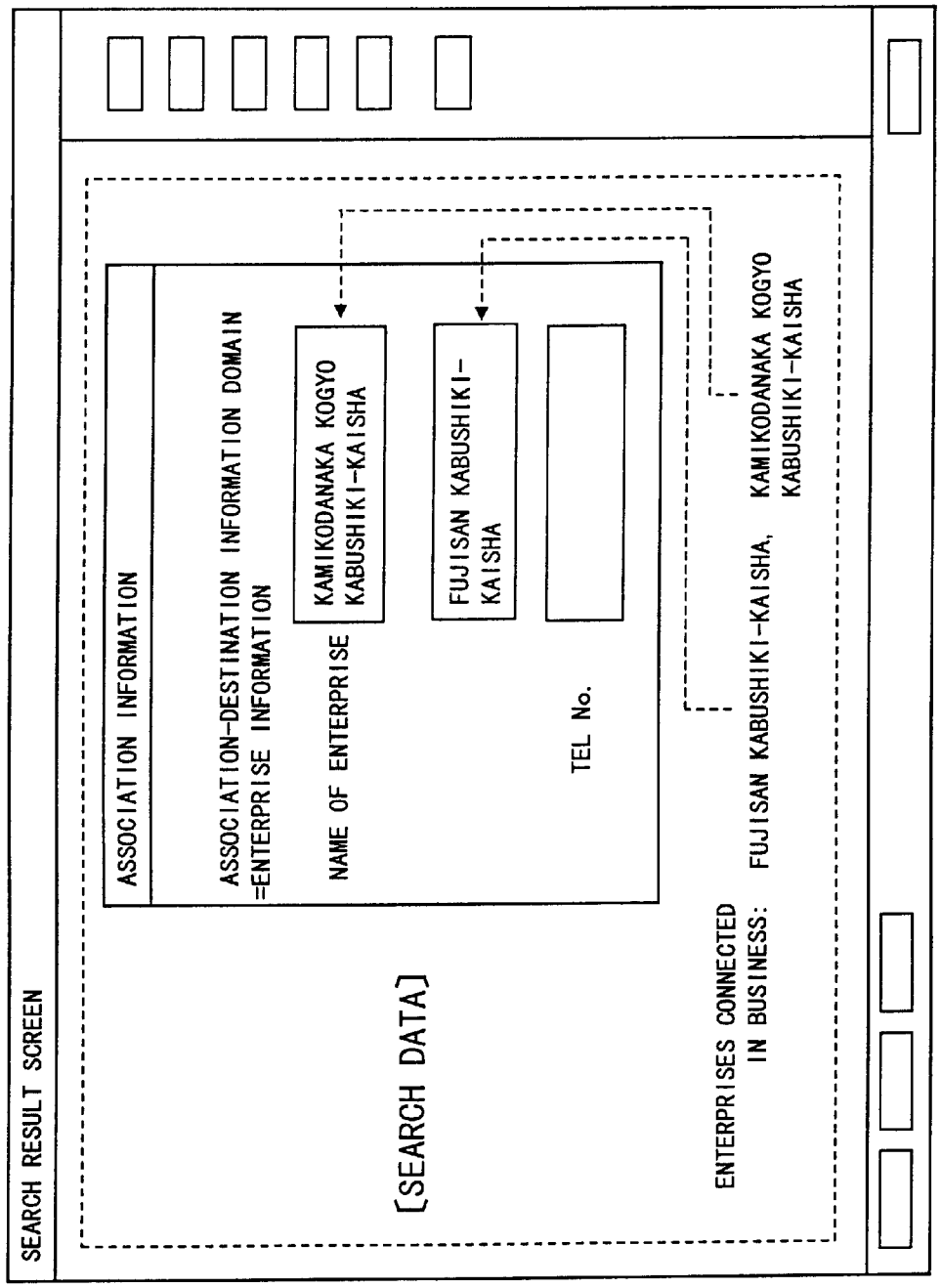
FIG. 20 is a diagram for explaining the third associative-information display screen.

More specifically, as shown in FIG. 20, in displaying the information domain of the association destination, the categories of the search keywords borne by this information domain (namely, "Name of Enterprise" and "Telephone No." in FIG. 20) are also indicated. Simultaneously, values concerning the search keyword of the information domain of the association source, the values having been obtained as the search result of this information domain (namely, "Fujisan Kabushiki-Kaisha" and "Kamikodanaka Kogyo Kabushiki-Kaisha" in FIG. 20), are indicated, and they are automatically set as the values of the search keyword of the information domain of the association destination.

When such a contrivance is adopted, the user is permitted to immediately search the information domain of the association destination by inputting only the values of the insufficient search keywords ("Telephone No. in FIG. 20).

In this way, when the user has issued the association request during his/her search of the certain information domain, the VKB engine 32 executes the process in which the information domain administering information deeply relevant to the information domain under the search is presented to the user in accordance with the associative dictionary 331.

As explained before, when the preference analysis engine 350 is disposed, it corrects the associative value of the associative dictionary 331 so as to meet the preference of the user, by utilizing the user's operation for selecting the association destination.

In this manner, even when a new database 2 has been added to the network 20 or when the contents of the database 2 already connected have been altered, the relevant-information retrieval system 1 of the present invention permits the user to acquire the information relevant to the information being currently searched for, without being conscious of the addition or the alterations at all. Thus, the user is permitted to freely search the databases 2 which are connected to the network 20.

Next, the processes of the present invention concerning the database model 330 will be described in conjunction with processing flows illustrated in FIGS. 21, 22 and 23.

Figure 21:
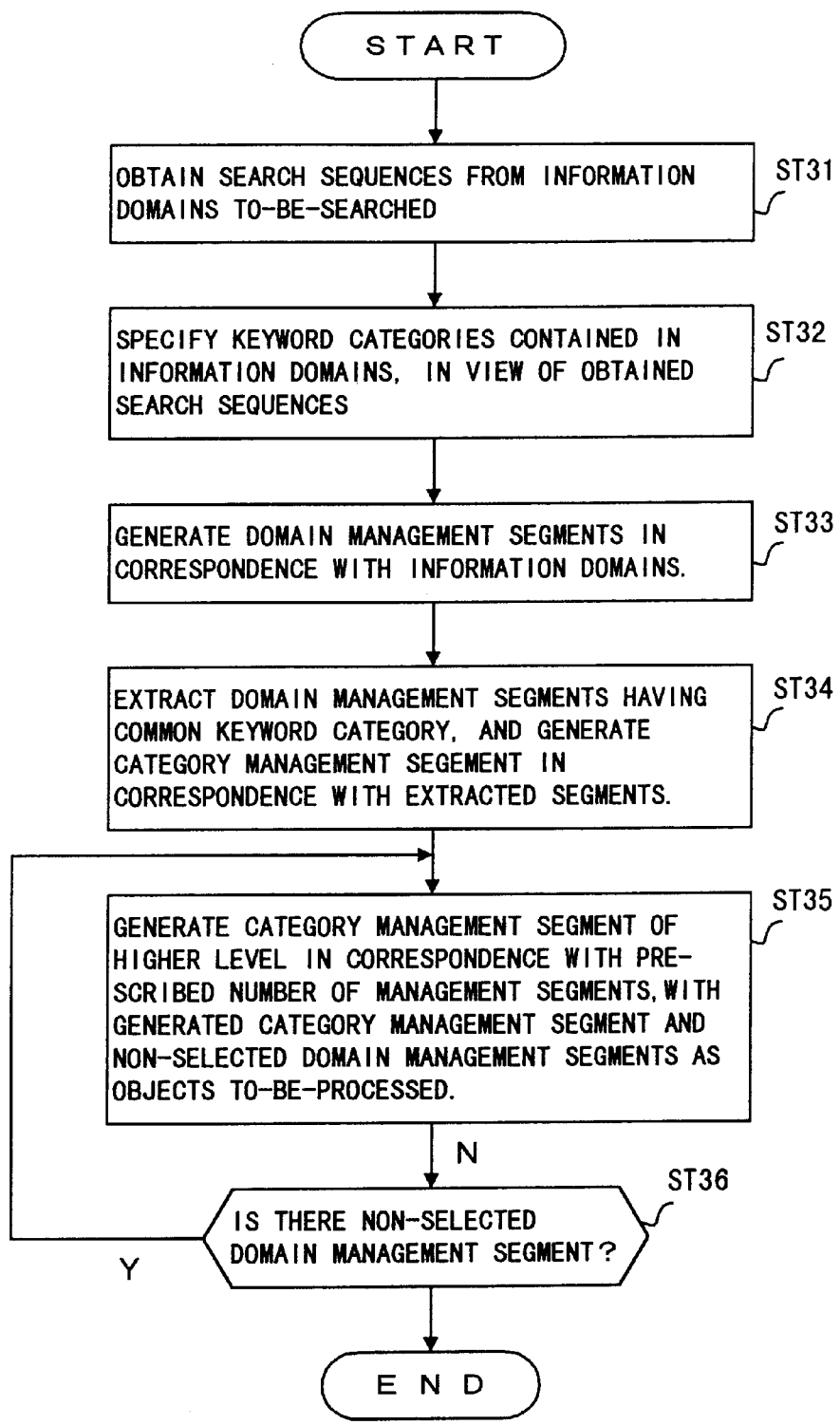
FIG. 21 is a flow chart showing a third process which is executed by the VKB engine.
Figure 22:
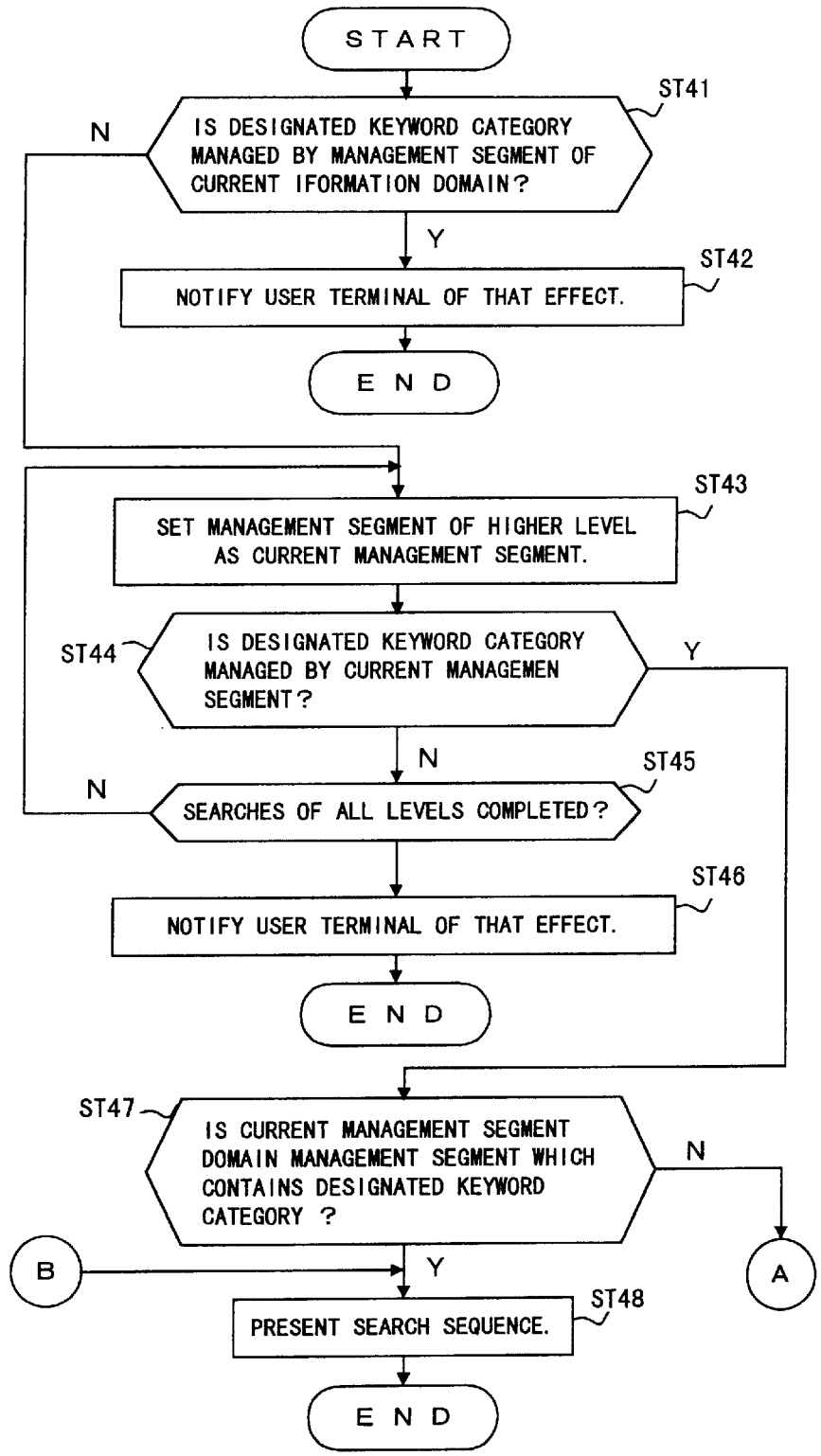
FIG. 22 is a flow chart showing a fourth process which is executed by the VKB engine.
Figure 23:
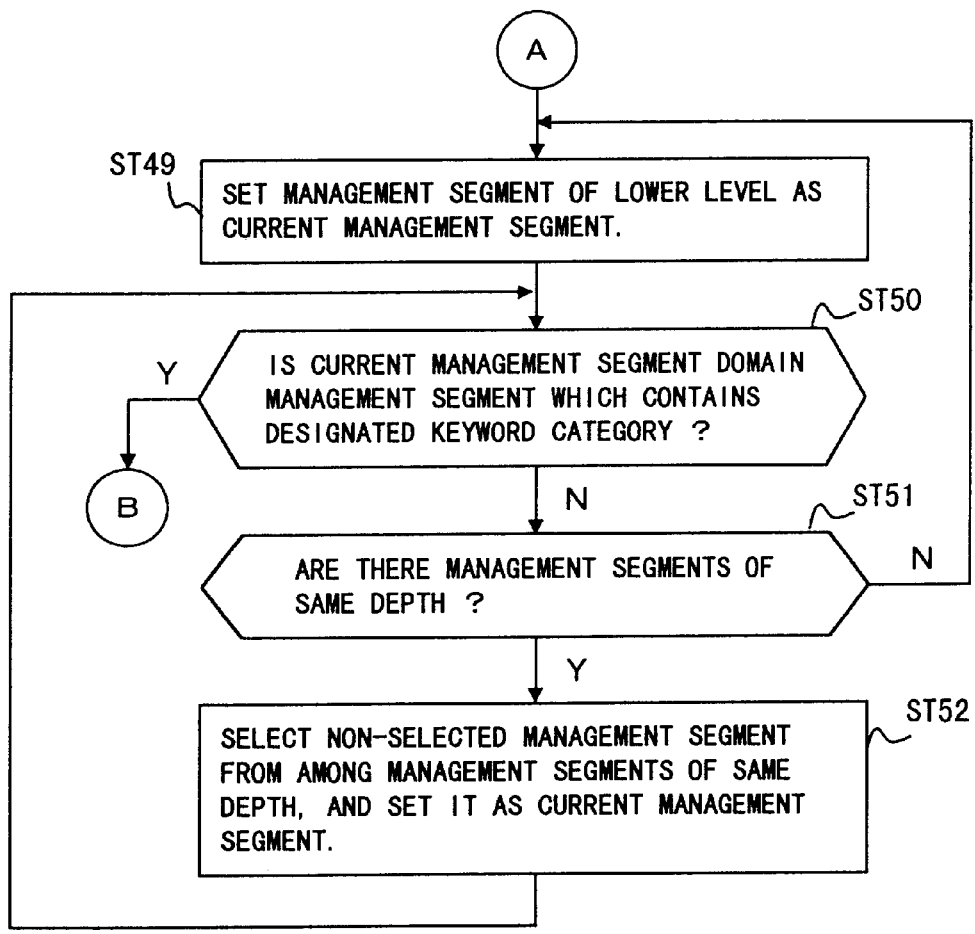
FIG. 23 is a flow chart showing a fifth process which is executed by the VKB engine.

Here, the processing flow shown in FIG. 21 is executed when the VKB engine 32 builds up the database model 330, and the processing flows shown in FIGS. 22 and 23 are executed when the VKB engine 32 offers relevant information by the use of the database model 330.

When a request for building up the database model 330 has been issued, the VKB engine 32 first accepts advertisement information items from all information domains (databases 2) to-be-searched and obtains search sequences contained in the advertisement information, at a step ST31 as shown in the processing flow of FIG. 21.

As stated before, the search sequence of the information domain is defined as follows:

[DB category]((KW category)[Necessity]
 [Actual data][Logical operator])*,( . . . ))
  DB category: Category of Information domain
  KW category: Category of Search keyword
  Necessity: Mandatory search keyword or Optional search keyword
  Actual data: Entity of Search keyword
  Logical operator: Logic between Search keywords.

This search sequence indicates, so to speak, the capability information of the corresponding information domain.

The information domains designated as objects to be searched advertise the search sequences being the capability information items of their own, to the relevant-information retrieval system 1 of the present invention which acts as an agent for the processes for searching the information domains. Therefore, the VKB engine 32 can obtain the search sequences of the information domains to-be-searched.

Subsequently, the categories of search keywords borne by the information domains are specified from the obtained search sequences at a step ST32.

By way of example, when the VKB engine 32 has obtained the search sequence:

Director information ([Names of Companies][Optional] [Actual data][&/][Names of Persons][Mandatory] [Actual data])

from the information domain administering director information, it specifies the "Names of Companies" and "Names of Persons" as the categories of the search keywords borne by the particular information domain.

At the next step ST33, the domain management segments 3300 explained with reference to FIG. 5 are generated in correspondence with the respective information domains to-be-searched. Besides, the search sequences obtained at the step ST31 and the categories of the search keywords specified at the step ST32 are entered into the generated domain management segments 3300.

By way of example, the domain management segment 3300 is generated in correspondence with the information domain administering the director information. Besides, the search sequence:

Director information ([Names of Companies][Optional] [Actual data][&/][Names of Persons][Mandatory] [Actual data])

and the search keyword categories "Names of Companies" and "Names of Persons" are entered into the generated domain management segments 3300.

In this way, as explained with reference to FIG. 6, the domain management segment 3300a is generated in correspondence with the information domain administering the financial information, the domain management segment 3300b is generated in correspondence with the information domain administering the director information, and the domain management segment 3300c is generated in correspondence with the information domain administering the map information, in the case where the subjects for searches are the financial-information administering information domain which has the search sequence "Financial information ([Names of Companies][Mandatory][Actual data] [NULL])", the director-information administering information domain which has the search sequence "Director information ([Names of Companies][Optional][Actual data] [&/][Names of Persons][Mandatory][Actual data])", and the map-information administering information domain which has the search sequence "Map information ([Addresses] [Mandatory][Actual data][NULL])".

At the subsequent step ST34, those of the domain management segments 3300 which have any common search keyword category are extracted, and the category management segment 3301 explained with reference to FIG. 5 is generated in correspondence with the extracted segments 3300. Besides, the search keyword categories managed by the domain management segments 3300 are entered into the generated segment 3301.

In the example of FIG. 6, the domain management segment 3300a which manages the search keyword category "Names of Companies", and the domain management segment 3300b which manages the search keyword categories "Names of Companies" and "Names of Persons", manage the common search keyword category "Names of Companies". Therefore, the category management segment 3301a is generated in correspondence with the two domain management segments 3300, and the search keyword categories "Names of Companies" and "Names of Persons" are entered into the generated category management segment 3301a.

At the next step ST35, a category management segment 3301 lying at a higher level of a tree structure is generated with the existing category management segment 3301 and a non-selected domain management segment 3300 as objects for processing, and in correspondence with the category management segment 3301 and domain management segments 3300 which are in a prescribed number of, for example, at most 3. Besides, the search keyword categories which are managed by the category management segment 3301 and the domain management segments 3300 at a lower level are entered into the generated category management segment 3301 at a higher level.

In the example of FIG. 6, the category management segment 3301b is generated in correspondence with the domain management segment 3300c managing the search keyword category "Addresses", and the category management segment 3301a managing the search keyword categories "Names of Companies" and "Names of Persons". Besides, the search keyword categories "Names of Companies", "Names of Persons" and "Addresses" are entered into the generated category management segment 3301b.

At the next step ST36, the VKB engine 32 judges whether or not any non-selected domain management segment 3300 remains. In the presence of the remaining segment 3300, the processing flow returns to the step ST35, and in the absence thereof, the illustrated process is terminated.

In this way, when the request for building up the database model 330 has been issued, the VKB engine 32 automatically builds up the database model 330 as shown in FIG. 6, by the use of the search keyword categories obtained from the information domains to-be-searched.

Incidentally, when the databases 2 to be searched are definite, the operator of the retrieval system 1 sometimes builds up the corresponding database model 330.

As will be explained later, the VKB engine 32 searches the database model 330, thereby to execute a process which presents the user with an information domain administering information relevant to information retrieved by the information search engine 31. The required time period of the process for searching the database model 330 depends upon the hierarchic structure of the database model 330. In this regard, when the efficiency of the search process is not considered, the hierarchic structure of the database model 330 need not be especially restricted. For this reason, the process for the formation of the tree structure as is executed at the step ST35 of the processing flow in FIG. 21 can be implemented by any of various algorithms.

Besides, in a case where the tree structure is fixed beforehand and where the information domain already knows the identifier of the category management segment 3301 at a higher level than the information domain itself, the VKB engine 32 can find the identifier from the advertisement information sent from the information domain and therefore builds up the database model 330 in accordance with the identifier.

Next, the relevant-information presenting process which is executed using the database model 330 will be explained with reference to the processing flows shown in FIGS. 22 and 23.

When the user has issued a relevant-information presenting request by designating a search keyword category, during his/her search of a certain information domain, the VKB engine 32 first executes a step ST41 as illustrated in the processing flows of FIG. 22. Here at the step ST41, the VKB engine 32 refers to a search keyword category managed by the domain management segment 3300 corresponding to the current information domain, thereby to judge whether or not the designated search keyword category is handled in the current information domain (the information domain which the user is searching).

When the designated search keyword category is handled in the current information domain as the judgement at the step ST41, the user terminal 3 is notified to that effect at a step ST42 subsequent to the step ST41.

On the other hand, when the designated search keyword category is not handled in the current information domain as the judgement at the step ST41, the processing flow proceeds to a step ST43, at which the VKB engine 32 refers to the tree structure of the database model 330, thereby to specify the category management segment 3301 just above the current domain management segment 3300. The specified category management segment 3301 is set as the current management segment.

Incidentally, the presentation process can also be so contrived that, even when the designated search keyword category is handled in the current information domain as the judgement at the step ST41, another information domain handling the search keyword category is presented. In this case, the processing flow proceeds from the step ST41 to the step ST43.

Subsequently, at a step ST44, the VKB engine 32 refers to the search keyword categories managed by the current category segment 3301, thereby to judge whether or not the designated search keyword category is managed by the current category management segment 3301.

When the designated search keyword category is not managed by the current category management segment 3301 as the judgement at the step ST44, the processing flow proceeds to a step ST45, at which the VKB engine 32 judges whether or not searches up to the uppermost-level category management segment 3301 of the database model 330 have been completed. In a case where the searches have been completed, the processing flow proceeds to a step ST46, at which the user terminal 3 is notified that no information domain bears the designated search keyword category. Then, the illustrated process is terminated.

On the other hand, in a case where the searches of the database model 330 have not been completed as the judgement at the step ST45, the processing flow returns to the step ST43 so as to iterate the processing of this step ST43 and the succeeding step ST44. As stated before, the step ST43 serves to specify the category management segment 3301 just above the current domain management segment 3300 and to set the specified category management segment 3301 as the current management segment. Besides, the step ST44 serves to judge whether or not the designated search keyword category is managed by the current category management segment 3301.

Meantime, when the designated search keyword category is managed by the current category management segment 3301 as the judgement at the step ST44, the processing flow proceeds to a step ST47, at which the VKB engine 32 judges whether or not the current management segment is the domain management segment 3300 bearing the designated search keyword category. When the current management segment is the domain management segment 3300 bearing the designated search keyword category, the processing flow proceeds to a step ST48, at which a search sequence managed by this domain management segment 3300 is presented to the user terminal 3, thereby to present the information required for the search of the information domain which bears the search keyword category desired by the user.

On the other hand, when the current management segment is not the domain management segment 3300 bearing the designated search keyword category as the judgement at the step ST47, the process advances to a step ST49 included in the processing flow of FIG. 23. Here at the step ST49, the VKB engine 32 specifies the management segment (domain management segment 3300 or category management segment 3301) just below the current management segment, and it sets the specified management segment as the current management segment anew. Thereafter, the processing flow proceeds to a step ST50, at which the VKB engine 32 judges whether or not the current management segment is the domain management segment 3300 bearing the designated search keyword category. When the current management segment is the domain management segment 3300 bearing the designated search keyword category, the processing flow returns to that step ST48 shown in FIG. 22 at which the VKB engine 32 operates to present the user terminal 3 with the information required for the search of the information domain which bears the search keyword category desired by the user.

On the other hand, when the current management segment is not the domain management segment 3300 bearing the designated search keyword category, as the judgement at the step ST50, the processing flow proceeds to a step ST51, at which the VKB engine 32 judges whether or not any non-selected management segment (domain management segment 3300 or category management segment 3301) has the same tree-structure depth as that of the current management segment. When any non-selected management segment having the same tree-structure depth as that of the current management segment does not exist as the judgement at the step ST51, the processing of the steps ST49 et seq. is repeated.

On the other hand, when any non-selected management segment having the same tree-structure depth as that of the current management segment exists as the judgement at the step ST51, the processing flow proceeds to a step ST52, at which the VKB engine 32 selects one of such non-selected management segments and sets the selected management segment as the current management segment. Subsequently, the processing flow proceeds to the step ST50, at which the VKB engine 32 judges whether or not the current management segment is the domain management segment 3300 bearing the designated search keyword category. When the current management segment is the domain management segment 3300 bearing the designated search keyword category, the processing flow returns to that step ST48 shown in FIG. 22 at which the VKB engine 32 operates to present the user terminal 3 with the information required for the search of the information domain which bears the search keyword category desired by the user.

In this way, when the user has issued the request for the process for the presentation of the relevant information by designating the search keyword category during his/her search of the certain information domain, the VKB engine 32 searches the database model 330, thereby operating so as to present the user terminal 3 with the information on the information domain which administers the relevant information.

Figure 24:
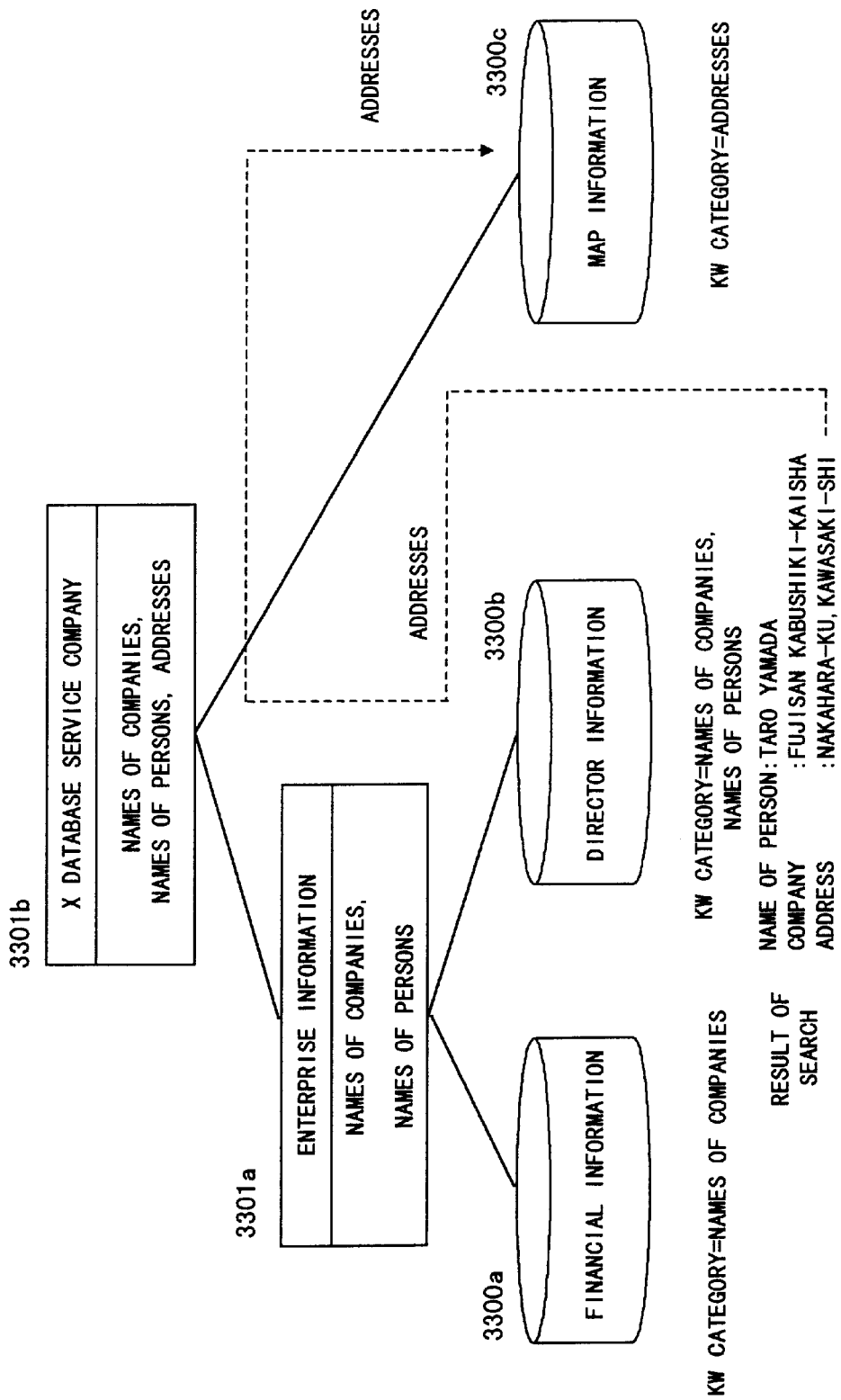
FIG. 24 is a diagram for explaining a search technique based on the database model.
Figure 25:
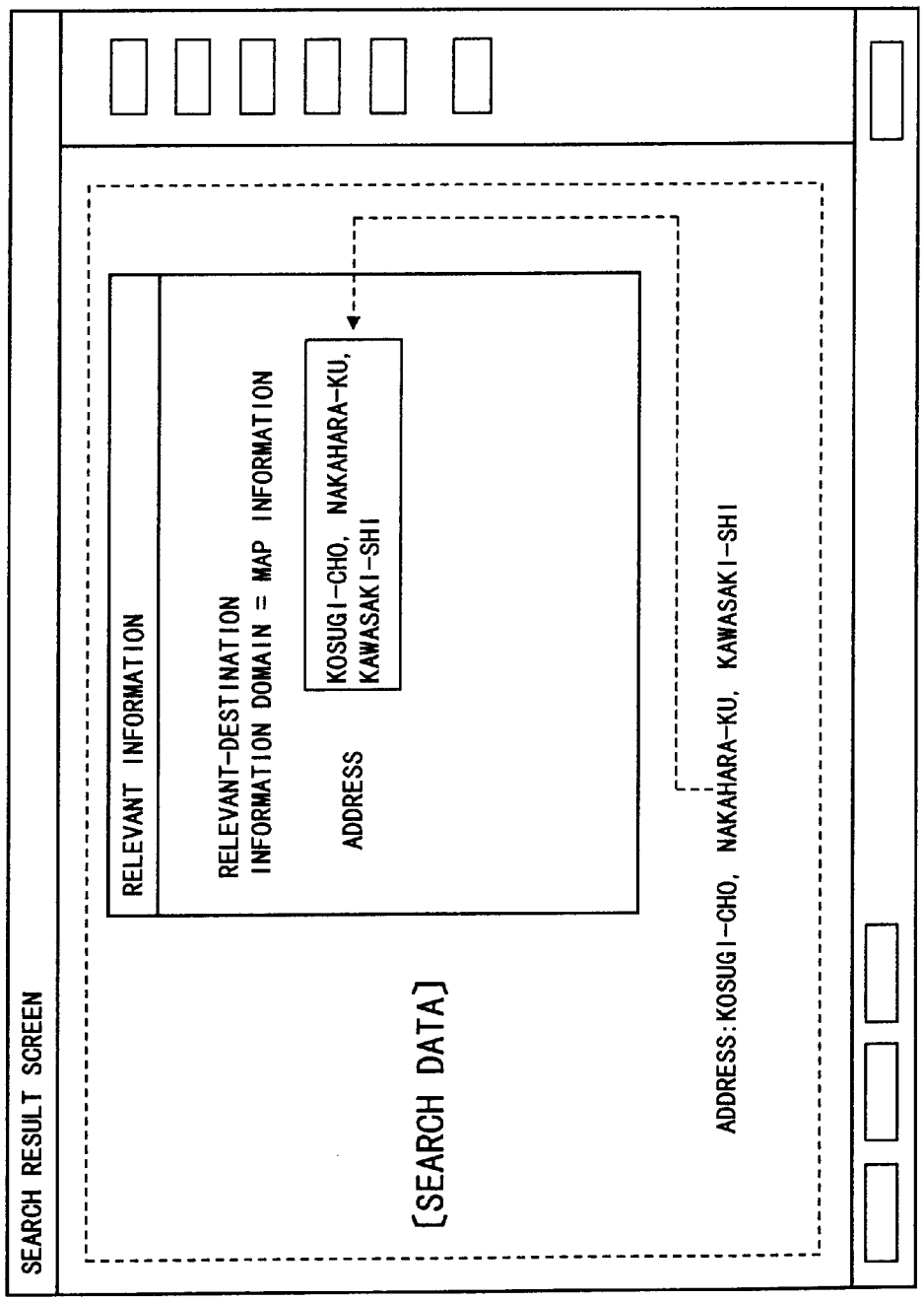
FIG. 25 is a diagram for explaining a relevant-information display screen.

By way of example, let's assume a case as shown in FIG. 24 where the user terminal 3 issues a request for the presentation of relevant information by designating a search keyword category "Addresses", when the user has searched an information domain which administers director information and which bears the following search sequence:

Director information ([Names of Companies][Optional] [Actual data][&/][Names of Persons][Mandatory] [Actual data])

thereby to obtain the search result of information (the address is "Kosugi-cho, Nakahara-ku, Kawasaki-shi") on "Taro Yamada" who is the director of "Fujisan Kabushiki-Kaisha". In this case, the VKB engine 32 traces the tree structure of a database model 330 as indicated by a broken line in FIG. 24, thereby to find an information domain which administers map information and which bears the search keyword category "Addresses". Besides, as illustrated in FIG. 25, the VKB engine 32 operates to present the user terminal 3 with such information as search keyword required for the search of the found information domain. Thus, the user is permitted to search for the map information of the address "Kosugi-cho Nakahara-ku, Kawasaki-shi".

On this occasion, the display of the associated information domains can also be so contrived that a value possessed by the information searched for is automatically set as the search keyword of the relevant information domain. More specifically, as shown in FIG. 25, in displaying the relevant information domain, the search keyword category borne by this information domain (namely, "Addresses" in FIG. 25) is also indicated. Simultaneously, a value concerning the search keyword of the relevant information domain, the value having been obtained as the search result of the information domain as the reference source of the relevant information (namely, "Kosugi-cho, Nakahara-ku, Kawasaki-shi" in FIG. 25) is indicated, and it is automatically set as the value of the search keyword of the relevant information domain.

When such a contrivance is adopted, the user is permitted to immediately search the relevant information domain by inputting only the value of the insufficient search keyword (such a value is not set in the case of FIG. 25).

In this manner, even when a new database 2 has been added to the network 20 or when the contents of the database 2 already connected have been altered, the relevant-information retrieval system 1 of the present invention permits the user to acquire the information relevant to the information being currently searched for, without being conscious of the addition or the alterations at all. Thus, the user is permitted to freely search the databases 2.

The relevant-information retrieval system 1 of the present invention employs the two presenting methods; the method in which the information domain administering the information relevant to the search result is presented using the associative dictionary 331, and the method in which the information domain administering the information relevant to the search result is presented using the database model 330.

With the former method, the information domain (database 2) whose search keywords agree more as being relevant to the search result is automatically presented, whereas with the latter method, the information domain (database 2) which bears the designated search keyword category is presented. Owing to the preparation of the two methods, the user is permitted to implement a heuristic search process for the information domains (databases 2) which are connected to the network 20.

Although the present invention has thus far been described in conjunction with the illustrated embodiments, it shall not be restricted to these embodiments. By way of example, in FIG. 18, the VKB engine 32 is so constructed as to indicate the associative route of the maximum estimative value on the display screen, but it may well indicate a plurality of associative routes having higher estimative values.

Besides, in FIGS. 22 and 23, the VKB engine 32 is so constructed as to present the information domain administering the relevant information, in the way that it begins to search the database model 330 upon receiving the search keyword category from the user. However, when accounting is not taken into consideration, the VKB engine 32 can also be so constructed as to present the information domain administering the relevant information, in such a way that the search keyword category contained in the search result is automatically extracted, whereupon the database model 330 is automatically searched in accordance with the extracted keyword category.

Figure 26:
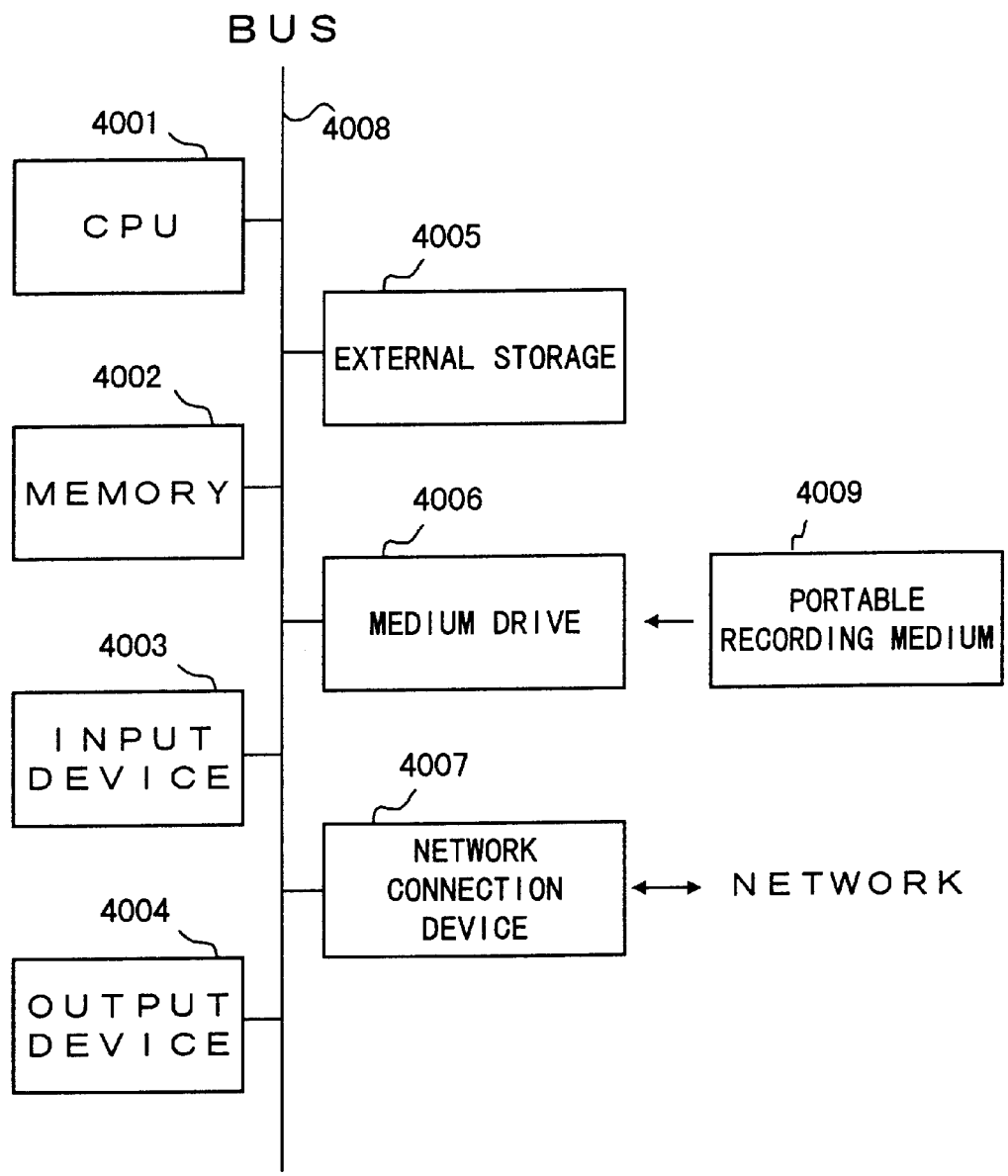
FIG. 26 is a block connection diagram showing the construction of an information processor.

Meanwhile, the relevant-information retrieval system 1 of the present invention can be constructed using an information processor (a computer) as exemplified in FIG. 26. The exemplified information processor is constituted by a CPU (central processing unit) 4001, a memory 4002, an input device 4003, an output device 4004, an external storage 4005, a medium drive 4006, and a network connection device 4007. These constituents are interconnected by a bus 4008.

The memory 4002 includes, for example, a ROM (read only memory) or a RAM (random access memory), in which programs and data for processes are stored. The CPU 4001 executes the necessary process by running the program through the utilization of the memory 4002.

Here, the information search engine 31, the VKB engine 32, the preference analysis mechanism 35, etc. correspond to software components which are described by the programs, and which are respectively stored in specific program code segments within the memory 4002.

The input device 4003 is, for example, a keyboard, a pointing device or a touch panel, which is used for inputting instructions and information from the operator of the retrieval system 1. The output device 4004 is, for example, a display unit or a printer, which is used for outputting queries and information to the operator.

The external storage 4005 is, for example, a magnetic disk device, an optical disk device or a magneto-optical disk device. It is also possible that the programs and data mentioned above are retained in the external storage 4005, whereupon they are loaded into the memory 4002 and used as may be needed. Moreover, the external storage 4005 can be employed as the VKB 33, normalization dictionary 34 and database 2.

The medium drive 4006 drives a portable recording medium 4009, and accesses the recorded contents of this medium. To be employed as the portable recording medium 4009 is any computer-readable recording medium, such as a memory card, floppy disk, CD-ROM (compact-disk read only memory), optical disk or magneto-optical disk. It is also possible that the programs and data mentioned above are stored in the portable recording medium 4009, whereupon they are loaded into the memory 4002 and used as may be needed.

The network connection device 4007 communicates with external devices, such as the user terminal 3 and the database 2, through any network (or line) such as LAN (local area network), and it performs data conversions involved in the communications. Besides, if necessary, the network connection device 4007 receives the above-mentioned programs and data from any external device in order that they may be loaded into the memory 4002 and be used.

Figure 27:
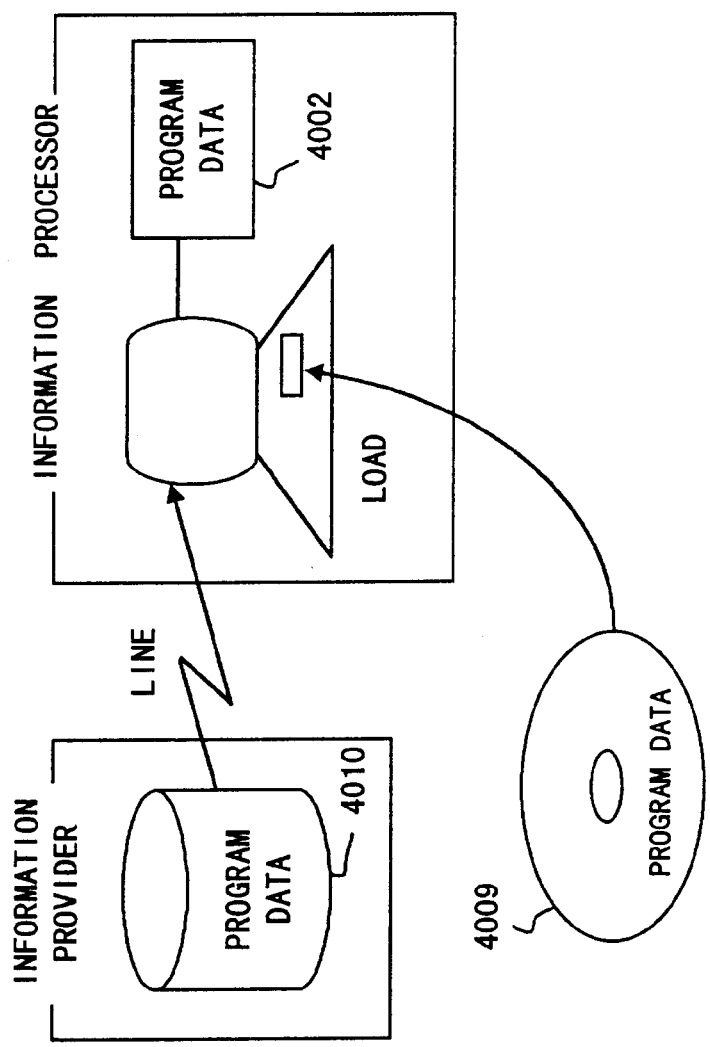
FIG. 27 is a diagram showing recording media.

FIG. 27 illustrates computer-readable recording media which can supply programs and data to the information processor shown in FIG. 26. The programs and data which are retained in the portable recording medium 4009 or an external database 4010, are loaded into the memory 4002. Besides, the CPU 4001 executes the necessary process by running the program with the data.

As described above, according to the present invention, in an environment where heterogeneous databases are united, a searcher for information is permitted to acquire information which is relevant to the information being currently searched for, with ease and in a refined and arranged form.

Thus, in the environment where the heterogeneous databases are united, the information searcher is permitted to execute a heuristic information search process, thereby to satisfy the subconscious search requests of the information searcher.

What is claimed is:

1. A relevant-information retrieval system which governs a plurality of independent databases, and which presents information on a database administering information relevant to information of a search request, to a source having issued the search request for the plurality of databases, comprising:

a management unit managing an association model which describes a relevancy among said plurality of databases in accordance with an associative value defined between two of said databases and representing a degree of association between the two of the databases;

a specification unit operating in a search process for a certain one of said plurality of databases, and specifying one of said databases administering information relevant to the certain database, in accordance with the association model managed by said management unit; and a presentation unit presenting the search request issuing source with information of the database specified by said specification unit.

2. A relevant-information retrieval system as defined in claim 1, further comprising:

a generation unit generating said association model by calculating the associative value from information of keywords employed in the two databases.

3. A relevant-information retrieval system as defined in claim 2, wherein:

said generation unit calculates said associative value from the number of keyword categories contained in an association destination, and the number of keyword categories agreeing between an association source and said association destination.

4. A relevant-information retrieval system as defined in claim 2, wherein:

said generation unit calculates said associative value in consideration of a weight which depends upon a combination of a mandatory keyword category and an optional keyword category.

5. A relevant-information retrieval system as defined in claim 1, further comprising:

a learning unit for updating said associative value so that a degree of association may enlarge with an increase in the number of times of reference by said search request issuing source.

6. A relevant-information retrieval system as defined in claim 1, wherein:

said specification unit supposes a plurality of associative routes which depend upon a depth of association, each of the associative routes including a plurality of databases, and estimates the respective associative routes on the basis of an associative value between two databases included in said respective associative routes and a distance between said two databases included in said respective associative routes, thereby to specify a database to serve as an association destination, as said database administering the relevant information.

7. A relevant-information retrieval system comprising:

a management unit managing an association model which describes a relevancy among a plurality of databases in accordance with an associative value defined among the plurality of databases and representing a degree of association among the databases;

a specification unit operating upon receiving a search request for a certain database, and specifying a database administering information relevant to the certain database, in accordance with the association model; and a presentation unit presenting information of the specified database.

8. A relevant-information retrieval system which governs a plurality of independent databases, and which presents information on a database administering information relevant to information of a search request, to a source having issued the search request for the plurality of databases, comprising:

a management unit managing a database model which describes a relevancy among said plurality of databases in accordance with a tree structure having nodes corresponding to the databases;

a specification unit operating in a search process for a certain one of said plurality of databases, and specifying one of said databases administering information relevant to the certain database, in accordance with the database model managed by said management unit; and a presentation unit presenting the search request issuing source with information of the database specified by said specification unit.

9. A relevant-information retrieval system as defined in claim 8, further comprising:

a generation unit generating said database model from information of keywords employed in said plurality of databases.

10. A relevant-information retrieval system as defined in claim 8, wherein:

said database model which is managed by said management unit is constructed of the tree structure including database management segments which are disposed in correspondence with the respective databases and which manage a keyword category employed for said respective databases, and a category management segment which lies at a higher level than the database management segments and which manages a keyword category managed by lower level management segments.

11. A relevant-information retrieval system as defined in claim 10, wherein:

said database management segments also manage search sequences of said respective databases.

12. A relevant-information retrieval system as defined in claim 10, wherein:

said specification unit traces said tree structure of said database model, thereby to specify a database containing a designated keyword category, as said database administering the relevant information.

13. A relevant-information retrieval system comprising:
- a management unit managing a database model which describes a relevancy among a plurality of databases in accordance with a tree structure having nodes corresponding to the databases;
- a specification unit operating upon receiving a search request for a certain database, and specifying a database administering information relevant to the certain database, in accordance with the database model; and
- a presentation unit presenting information of the specified database.

14. A program recording medium storing therein a program for a computer which governs a plurality of independent databases, and which presents information on a database administering information relevant to information of a search request, to a source having issued the search request for the plurality of databases, the stored program causing the computer to execute:
- a specification process occurring in a search process for a certain one of said plurality of databases, for specifying one of said databases administering information relevant to the certain database, in accordance with an association model which describes a relevancy among said plurality of databases on the basis of an associative value defined between two of said databases and representing a degree of association between the two of the databases; and
- a presentation process for presenting the search request issuing source with information of the database specified by said specification process.

15. A program recording medium storing therein a program for a computer which governs a plurality of independent databases, and which presents information on a database administering information relevant to information of a search request, to a source having issued the search request for the plurality of databases, the stored program causing the computer to execute:
- a specification process occurring in a search process for a certain one of said plurality of databases, for specifying one of said databases administering information relevant to the certain database, in accordance with a database model which describes a relevancy among said plurality of databases on the basis of a tree structure having nodes corresponding to the databases; and
- a presentation process for presenting the search request issuing source with information of the database specified by said specification process.

16. A relevant-information retrieval method comprising:
- generating an association model which describes a relevancy among a plurality of databases in accordance with an associative value defined among the plurality of databases and representing a degree of association among the databases;
- receiving a search request for a certain database;
- specifying a database administering information relevant to the certain database, in accordance with the association model; and
- presenting information of the specified database.

17. A relevant-information retrieval method comprising:
- generating a database model which describes a relevancy among a plurality of databases in accordance with a tree structure having nodes corresponding to the databases;
- receiving a search request for a certain database;
- specifying a database administering information relevant to the certain database, in accordance with the database model; and
- presenting information of the specified database.

18. A method comprising:
- generating an association structure including nodes representing databases, selected nodes being linked with associative values representing a degree of association between the linked databases represented by the linked nodes; and
- upon receiving a search request for a particular database, identifying an associated database associated with the particular database by searching the association structure.

19. A computer readable storage medium, storing a program instructing a computer to perform:
- generating an association structure including nodes representing databases, selected nodes being linked with associative values representing a degree of association between the linked databases represented by the linked nodes; and
- upon receiving a search request for a particular database, identifying an associated database associated with the particular database by searching the association structure.

20. An apparatus comprising:
- a management unit managing an association structure including nodes representing databases, selected nodes being linked with associative values representing a degree of association between the linked databases represented by the linked nodes; and
- a specifying unit identifying an associated database associated with a requested database by searching the association structure stored in the management unit.

* * * * *